March 5, 1935.   B. B. HOLMES   1,993,551
AUTOMATIC STEERING SYSTEM FOR DIRIGIBLE CRAFT
Filed Jan. 21, 1933   8 Sheets-Sheet 1
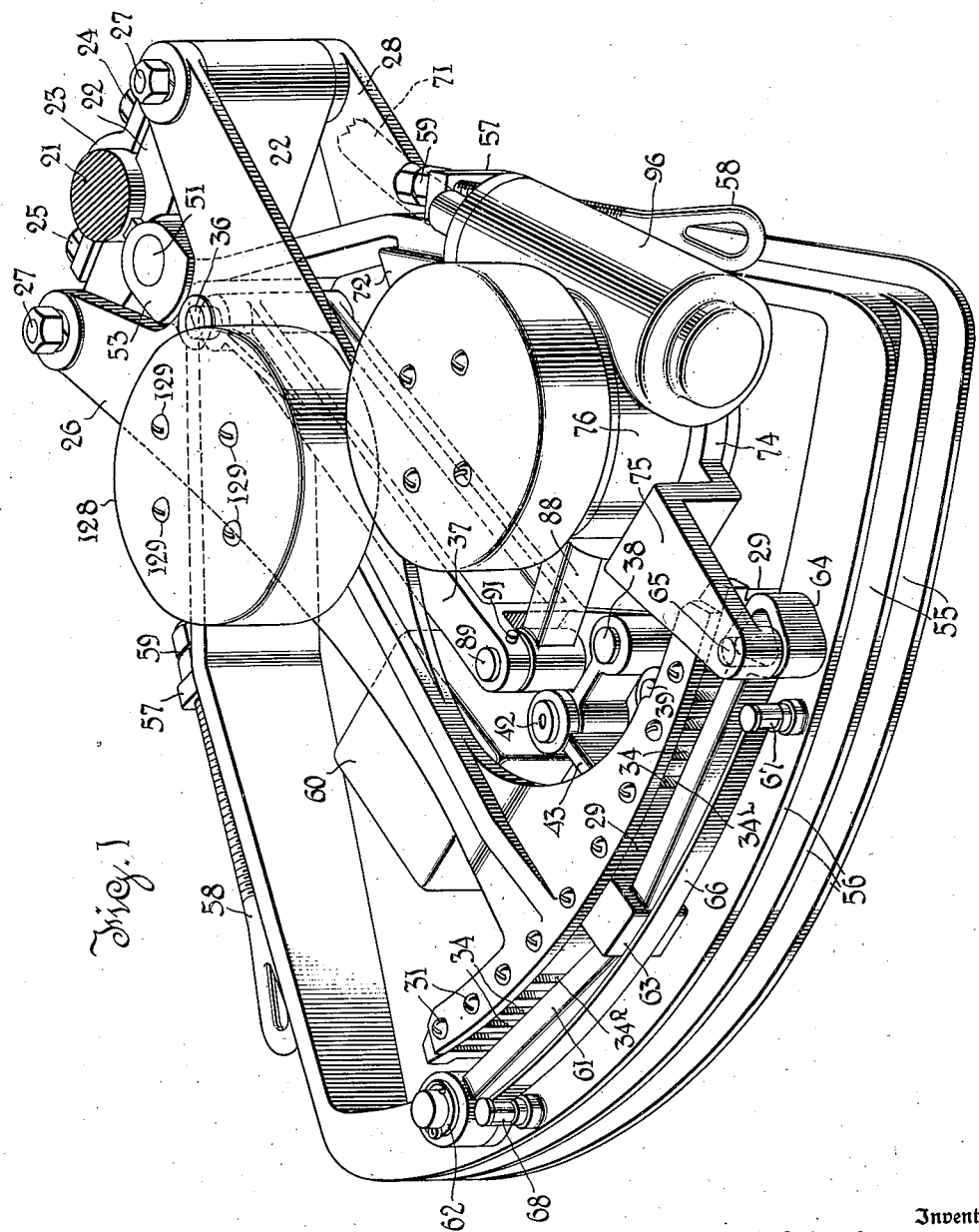

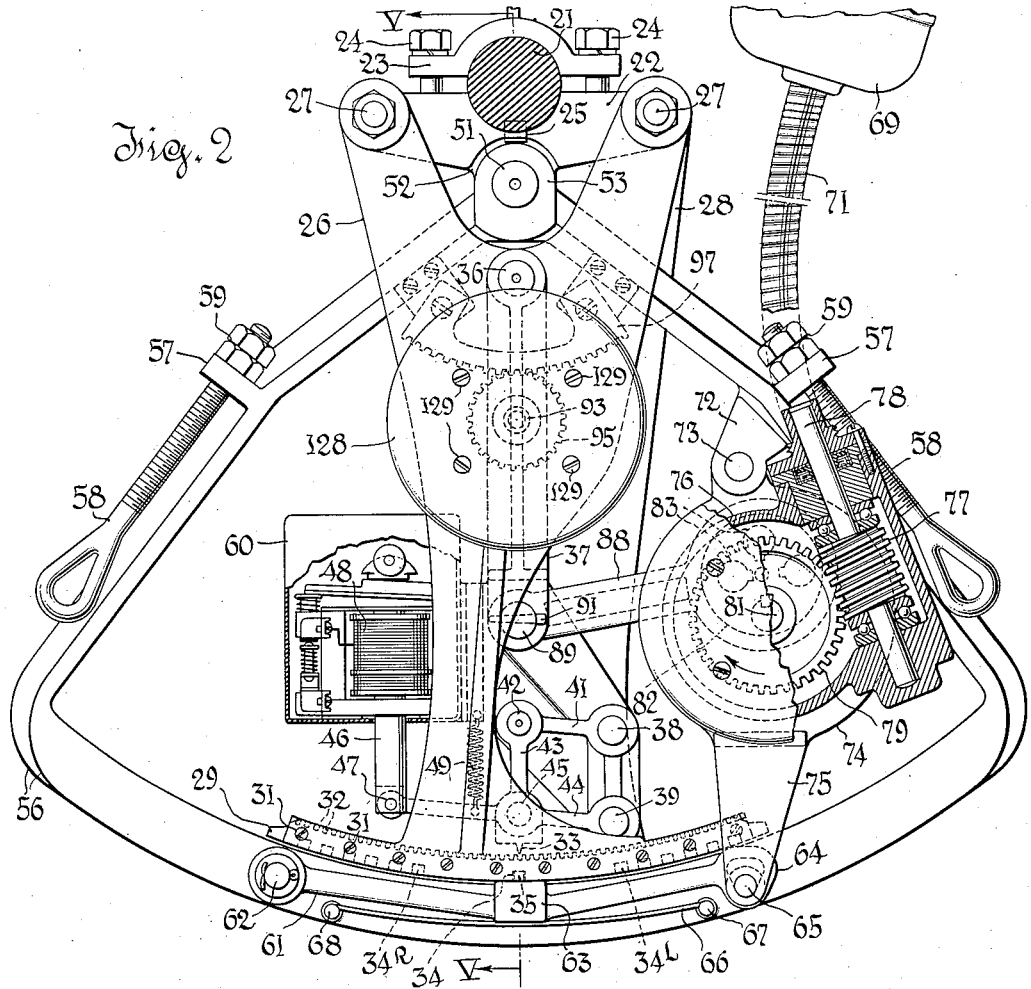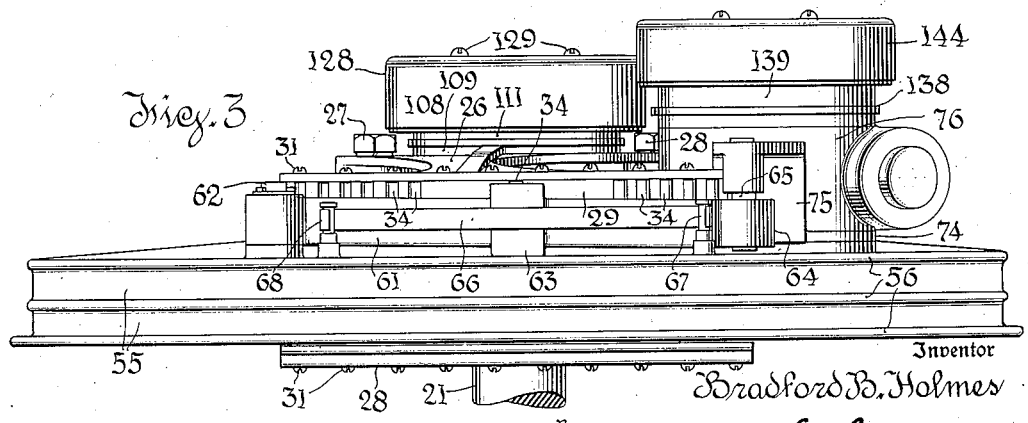

Inventor
Bradford B. Holmes
Attorneys

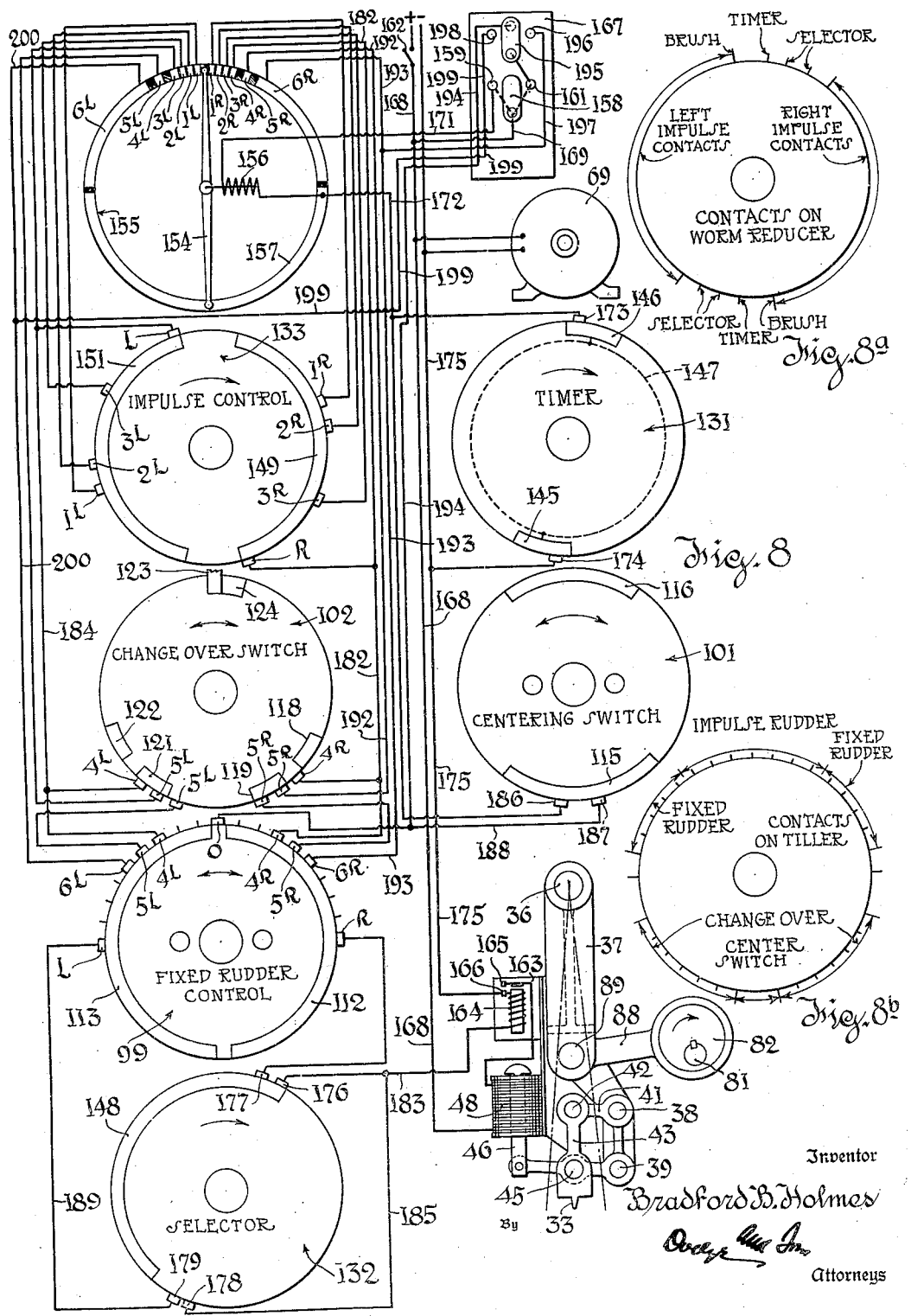

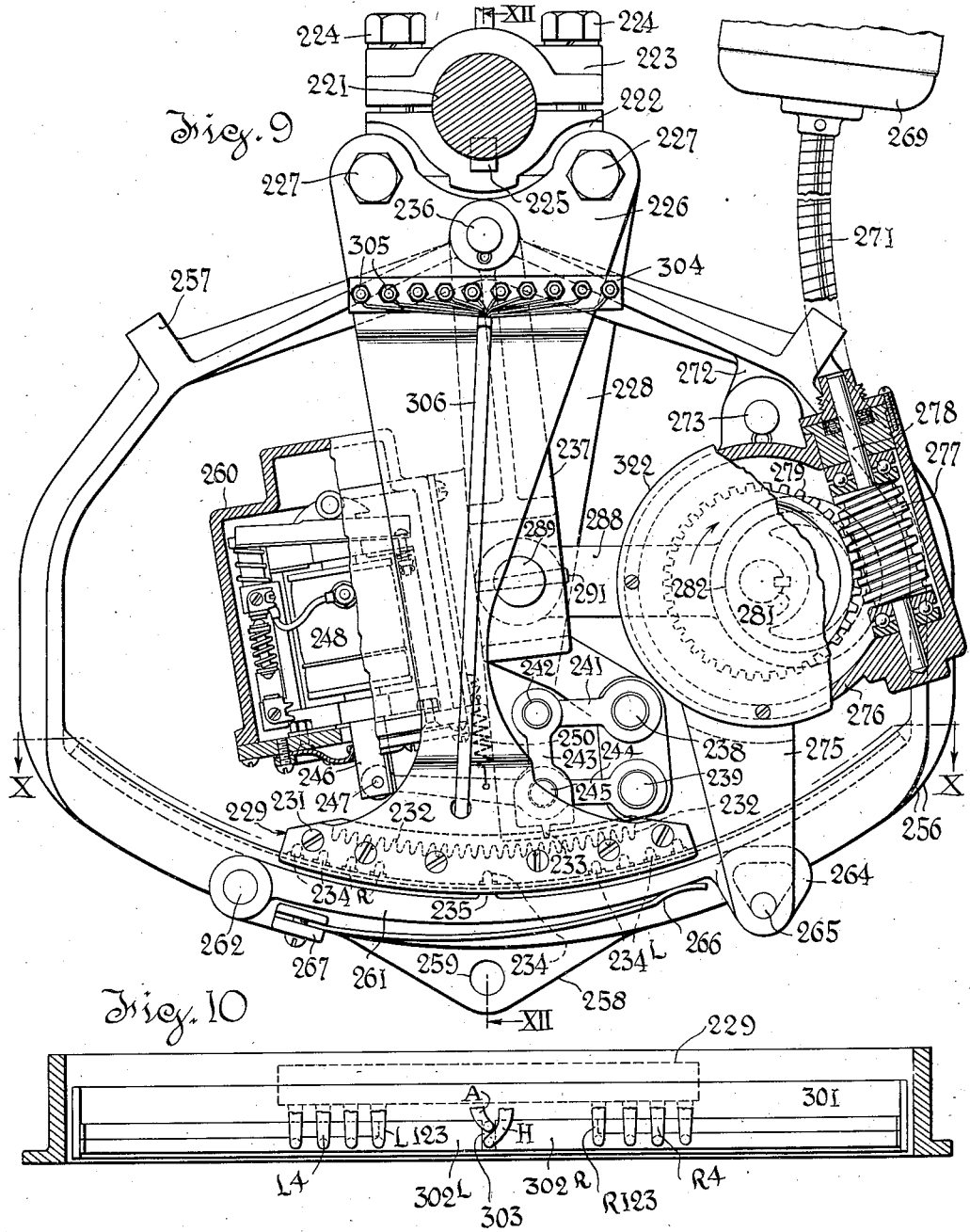

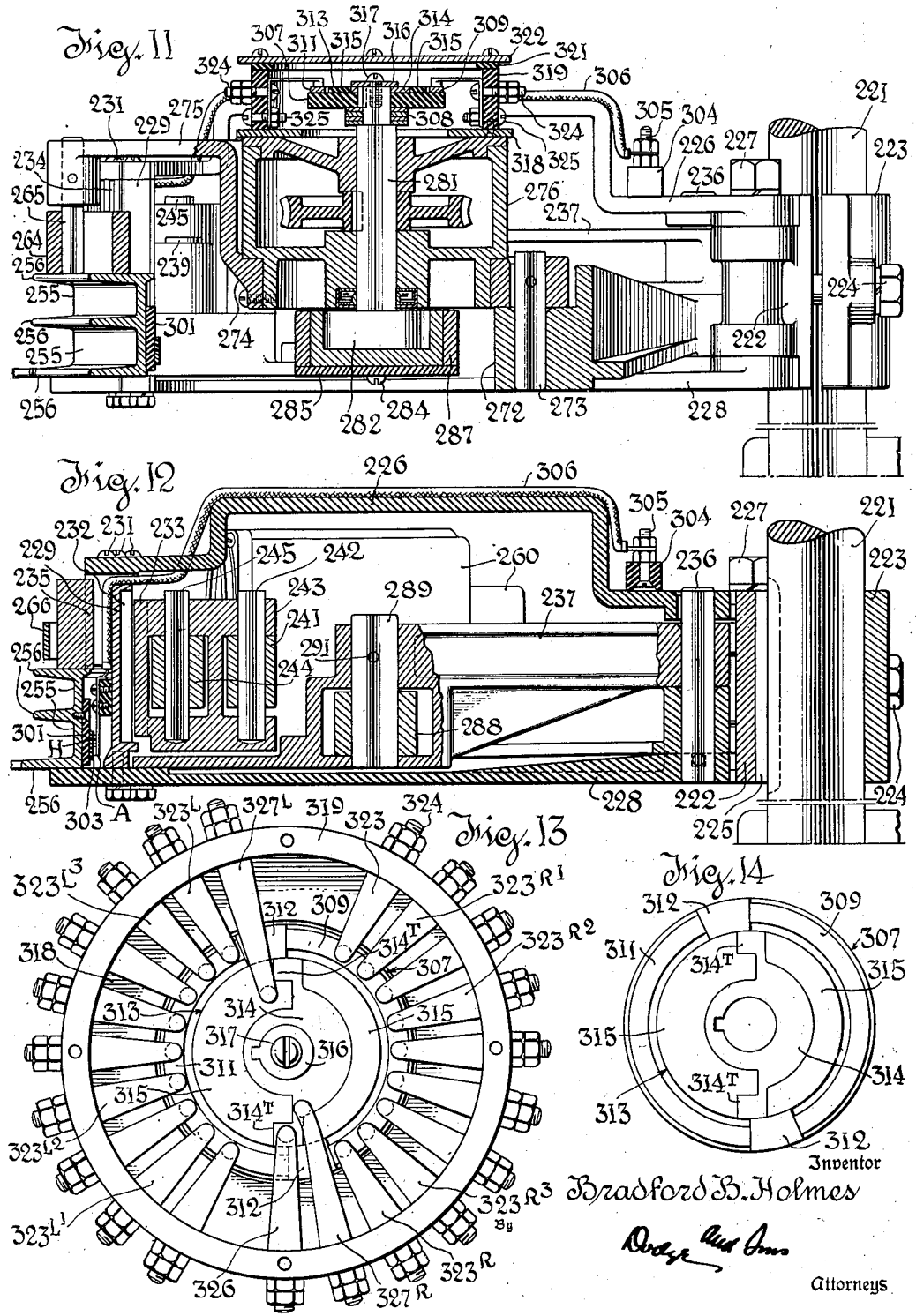

March 5, 1935.    B. B. HOLMES    1,993,551
AUTOMATIC STEERING SYSTEM FOR DIRIGIBLE CRAFT
Filed Jan. 21, 1933    8 Sheets-Sheet 7
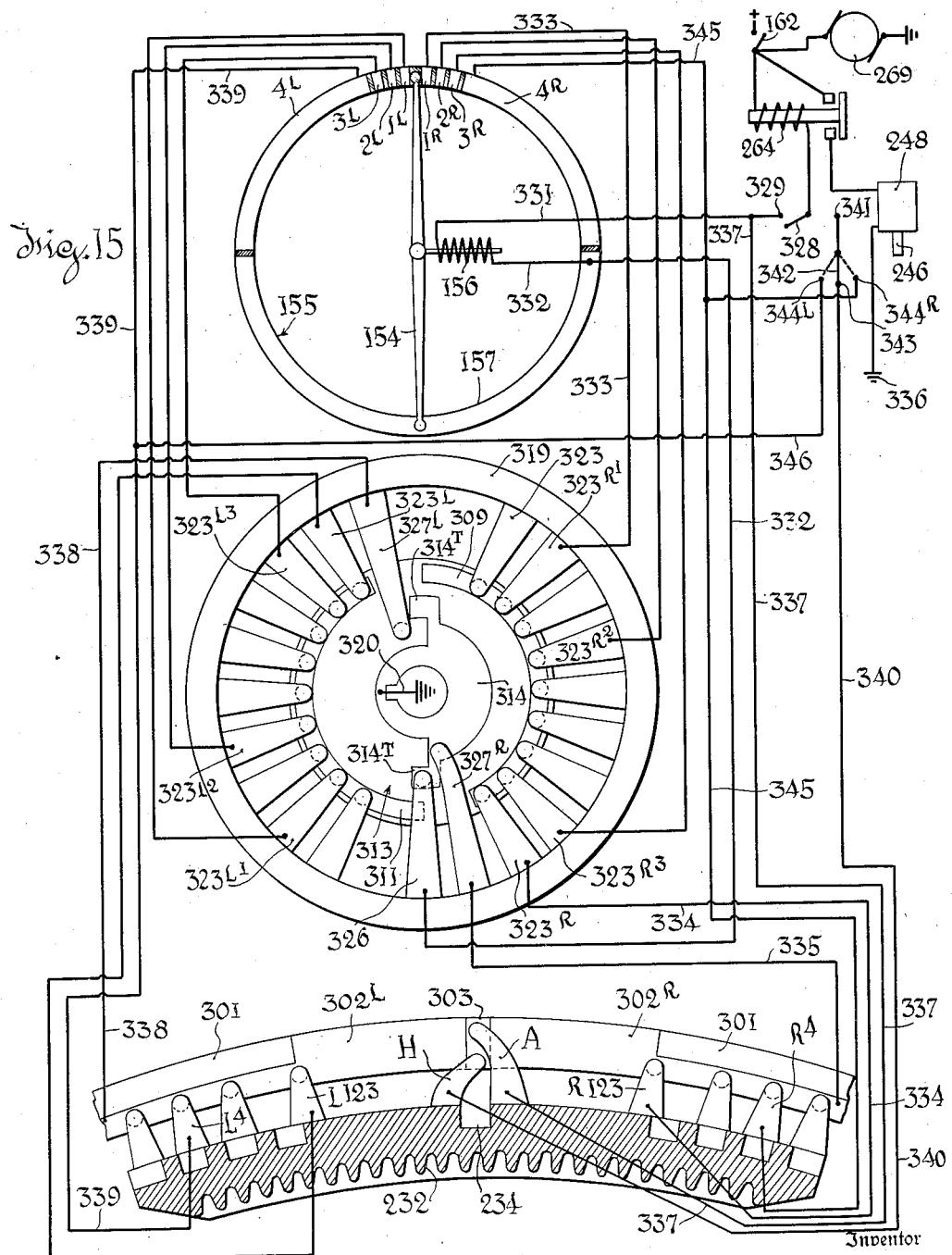

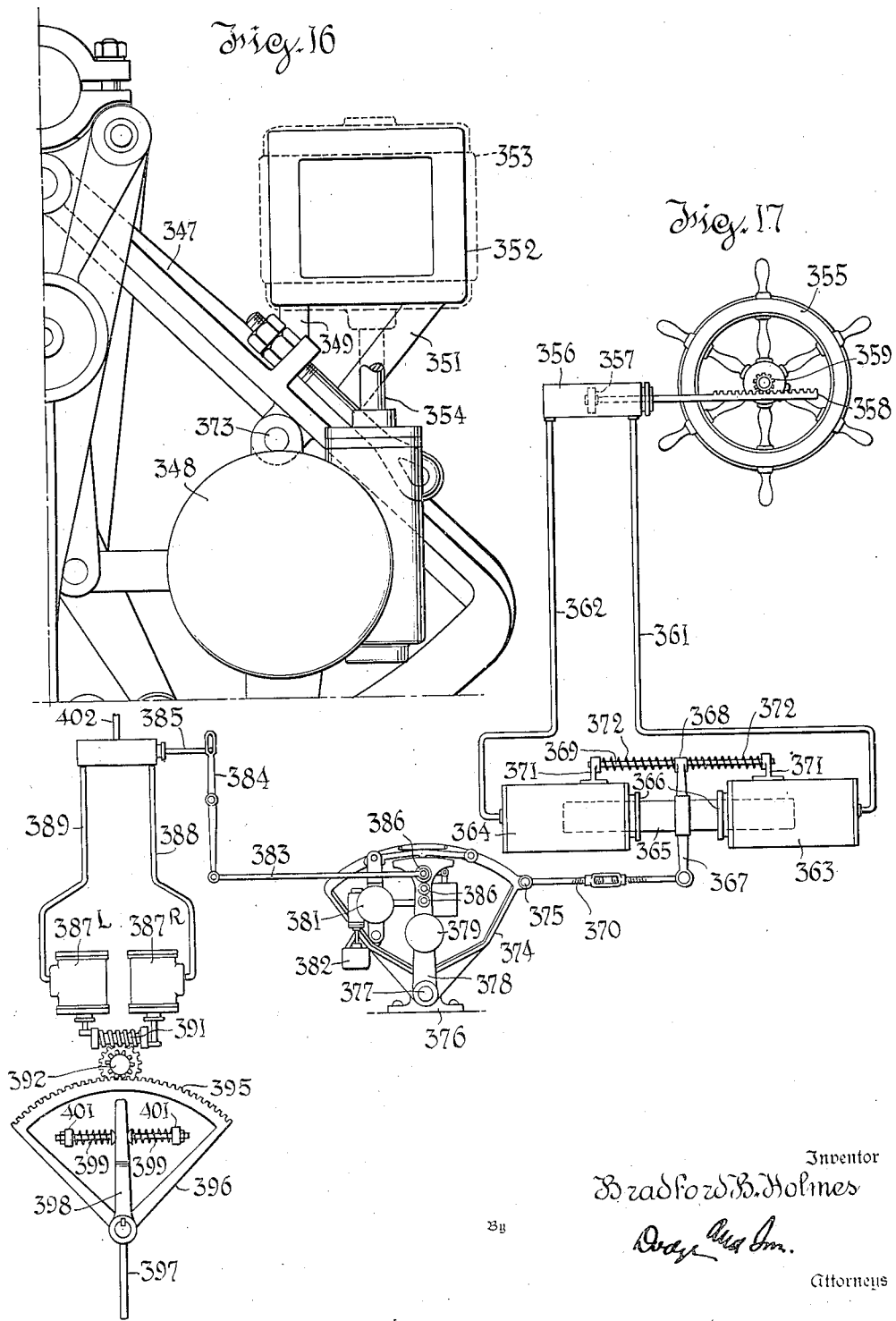

Patented Mar. 5, 1935

1,993,551

UNITED STATES PATENT OFFICE 1,993,551

AUTOMATIC STEERING SYSTEM FOR DIRIGIBLE CRAFT

Bradford B. Holmes, Stonington, Conn., assignor to Ruth V. Holmes, Stonington, Conn.

Application January 21, 1933, Serial No. 652,893

50 Claims. (Cl. 114—144)

This invention relates to automatic steering systems for dirigible craft. More particularly, it relates to a system embodying both method and apparatus constituting an improvement upon that described and claimed in my two copending applications, Serial No. 550,792, filed July 14, 1931; and Serial No. 585,122, filed January 6, 1932.

In automatic steering of craft, it has been usual to move the rudder as soon as the craft leaves its course; to increase the rudder in varying amounts as it departs further from its course; to take off most of the rudder applied as soon as it starts to return to its course; and, finally, to ease it back under a light decreasing rudder. Under this system, one swing of the rudder is used on each deviation of the craft. The system is cyclical; whereas the movements of the craft are erratic and not cyclical. Great difficulty is encountered in returning and stopping the craft exactly on its course. The craft usually fails to stop exactly on its course and tends to overswing, so that it steers a waving or "sine curve" course.

I have found if the rudder is given a series of "flicks" or "impulses" at periodic intervals, and then allowed to trail, or is returned positively to the amidships position in the intervals between impulses, and if the impulses are increased with increased deviation of the craft but kept small enough so that the effect of each impulse dies out before the next is applied, that stable steering results.

Accordingly, the primary object of this invention is to provide means for periodically swinging the rudder in a corrective direction, and allowing it to trail in the intervals between swings when the craft is off, but near, its course; for holding the rudder on continuously when the craft is considerably off the course; to provide means for decreasing the range through which the swings or impulses are initiated, and increasing the range of fixed rudder as the craft departs from its course, and increasing the range of impulses and decreasing the range of fixed rudder as it returns toward its course. It may further consist in subjecting the rudder to small alternate right and left swings when the craft is on its course.

Another object of the invention is to provide a remote control device whereby a craft may be steered from locations far removed from the pilot wheel, and such control may be transferred to or removed from the pilot wheel at any time.

A further object of the invention is to insert an automatic steering device as a link between the pilot wheel and rudder in the usual manual steering system, in such a way that the pilot wheel controls the steering device and rudder at all times and can be used for hand steering whether the automatic mechanism is active or inactive. The arrangement is also such that the hand wheel can be used to shift the center or neutral position of the automatic device, thus adjusting the amidships position of the rudder. Furthermore, it is unnecessary to connect or disconnect the automatic mechanism from the manual control when one form of control is to be substituted for the other.

Accordingly, the method consists in subjecting the rudder to swings timed at about 2 or 3 second intervals for small water craft of approximately 40 to 50 feet in length, and for longer intervals on craft of greater length.

The amplitude of the swings is varied in steps for different deviations of the craft from its course. As an illustration, the rudder might be subjected to 1° alternate swings when the craft is on its course, to 3° swings in a corrective direction when the craft is off its course from ½° to 1½°, to 4° swings in a corrective direction for positions between 1½° and 3° from the course, and 5° swings for positions between 3° and 5° off its course. In the following specification, it will be considered that the craft is near its course when the deviation is not more than 5° or 6°.

The above example given relates to control under average or ideal conditions, where the movements of the craft off its course are small and there are no severe weather conditions to be met. When, however, the craft departs more than approximately 5° from its course, as it would in heavy weather or in changing course, means are provided for holding the rudder continuously deflected at angles increasing roughly with, but not necessarily proportional to, the increase of angular deviation of the craft from its course.

Means are provided for decreasing the rudder deflection when the craft starts to return to its course, such decrease being at the same rate as the increase was previously, or faster, as may be desired, until the craft returns to within approximately 10° to 7° from its course, and then the series of rudder swings recommences and continues until the craft reaches its course.

Means are also provided for adjusting the duration and extent of the rudder swings, to fit the steering characteristics of the craft on which the system is installed.

In the following specification, the recurrent swings of the rudder will be designated "impulses", and steering carried out by subjecting the rudder to such impulses will be designated "impulse steering". When the rudder is held in deflected position continuously, this will be designated as "fixed rudder steering".

As used in this specification, the phrase "amidships position of the rudder" refers to that position of the rudder in which it tends to hold the craft on a straight line and compensates for deviation due to propeller speed, list and wind pressure.

In the applications above referred to, steering was carried out by the "impulse" method. This method is periodic but not cyclical, and adapts itself to existing conditions to give a "dead beat" or "aperiodic" system of steering.

Generally expressed, the impulse method consists in subjecting the rudder to periodic deflections and in controlling either the extent or the duration of the deflections, or both, in accordance with the angular position of the craft relative to its course. This method of steering is very effective, particularly for small craft, but when applied to the steering of large craft, the power consumption becomes excessive and when a vessel is subjected to large changes in course, due either to heavy weather or to changing course, the effect of the large deflections given to the rudder is the same as it would be if the rudder were continuously held in one position, but with a smaller deflection than would be given it with the periodic deflection method.

In other words, when the craft departs so far from its course that the rudder impulses must be large to return the craft to the course, these impulses overlap in their effect and give much the same effect that they would if the rudder were held continuously in a deflected position, but at a smaller angle. While it is practical and even desirable to steer small craft according to this method, because of the extreme simplicity of the apparatus, on larger craft, where the amount of power required to deflect the rudder becomes a material factor, it is not desirable to use the impulse system on large rudder angles because of the greatly increased amount of power required.

Consequently, this invention provides means for utilizing the advantages of impulse steering for small angles of rudder deflection requiring little power, and for holding the rudder continuously in various deflected positions after the amplitude of the impulses becomes so large that the impulses overlap in their effects. In positions near the course, the craft is acted upon according to the impulse method and each impulse acts alone so that the craft is stepped but not swung exactly back to its course, with no tendency to overswing or to be unstable.

By way of illustration, the invention will be described as applied to a marine craft having a magnetic compass, but it will be understood that the device is of general application to dirigible craft of all kinds, regardless of the particular type of course indicator employed. Several forms of apparatus for carrying out the method have been illustrated, and it will be pointed out how these modifications may be employed to render the apparatus suitable for application to craft of different styles and sizes.

The invention will be more fully understood from a reading of the following description, in connection with the accompanying drawings, in which:—

Fig. 1 is a perspective view of one form of tiller and quadrant construction embodying this invention;

Fig. 2 is a plan view of the apparatus shown in Fig. 1, with parts broken away to show the interior construction;

Fig. 3 is a front elevation of the apparatus shown in Figs. 1 and 2;

Fig. 8 is a circuit diagram showing the electrical control circuits of the system and including the compass controller elements;

Fig. 8a is a diagram showing the relation of the contacts of the circuit controlling devices of Fig. 4, it being assumed that the observer looks at these devices from the top of this figure;

Fig. 8b is a diagram similar to that of Fig. 8a, but showing the relation of the circuit controlling contacts of the mechanism of Fig. 5;

Fig. 9 is a plan view of a modified and simplified tiller and quadrant construction, with parts broken away to show the interior mechanism;

Fig. 10 is a section on line X—X of Fig. 9, showing the circuit controlling contacts carried by the quadrant;

Fig. 11 is a view in side elevation of the structure shown in Fig. 9, with parts broken away to show the interior construction of the circuit controlling devices;

Fig. 12 is a vertical section taken substantially on line XII—XII of Fig. 9;

Fig. 13 is a plan view of the circuit controlling device shown in Fig. 11, with the cover plate removed to show the contacts and the segments with which they cooperate;

Fig. 14 is a plan view of the contact disc shown in Figs. 11 and 13, the disc being removed from the assembly to illustrate more clearly the relation of the parts;

Fig. 15 is a circuit diagram of the modified construction shown in Figs. 9 to 14;

Fig. 16 is a plan view of a portion of a structure modified to have the driving motor mounted directly on the quadrant; and Fig. 17 is a diagram showing one method of utilizing the principles and apparatus of this invention in connection with a ship telemotor system.

Figure 4:
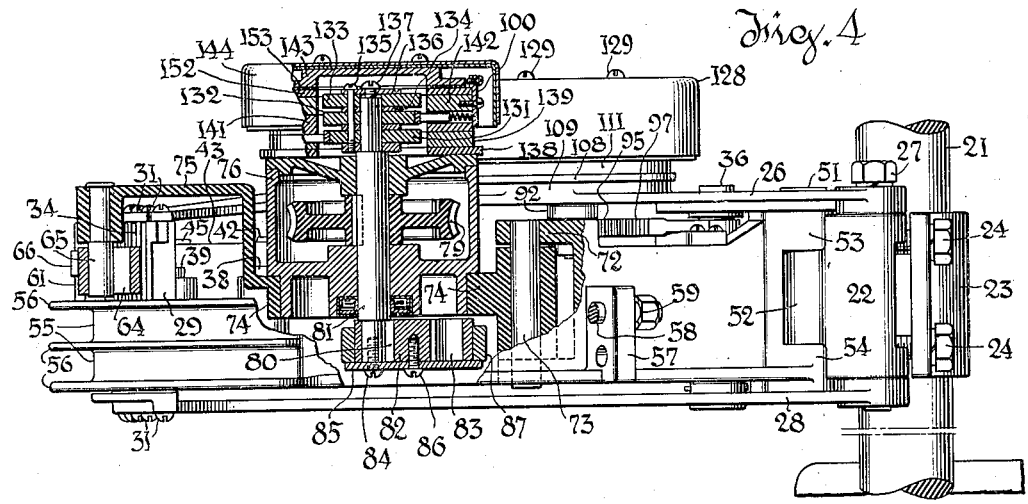
Fig. 4 is a side elevation of the apparatus of Fig. 3, with the parts broken away to show the interior mechanical and electrical control devices.

Automatic steering systems embodying this invention may be used to operate the rudder of small craft directly, or to function in connection with a power steering engine in large installations where rudder movement is brought about by such an engine, and control is exercised through a telemotor device connected with the pilot wheel.

In explaining the details of construction and operation of apparatus embodying this invention, it will first be assumed that the installation is made on a small craft where control is applied directly to the rudder of the craft, and the direction controlling device of the craft is a magnetic compass.

Referring first to Figs. 1 to 5 of the drawings, the reference character 21 designates the rudder post of the craft. Attached to the rudder post by a bracket 22 and a cap 23 secured to the bracket by bolts 24 and key 25, is a tiller. This tiller comprises a top tiller plate 26 having two legs which are bolted to the bracket 22 by bolts 27. These bolts also secure a bottom tiller plate 28 in position on the bracket and in spaced parallel relation to the plate 26. The ends of plates 26 and 28 remote from the bolts 27 are held in spaced relation by an arcuate latch plate 29 secured to the tiller plates 26 and 28 by screws 31. The inner face of plate 29 contains ratchet teeth 32 throughout its extent and adapted for cooperation with a swinging detent 43 having a small hardened tooth 33. The outer face of the latch plate 29 contains a plurality of spaced latch receiving openings 34 adapted for cooperation with a latch tooth 35, later to be described.

Pivotally mounted between tiller plates 26 and 28, and swingable about a hinge pin 36 is an oscillating arm 37, such arm being actuated by constantly rotating mechanism carried by the quadrant with which the tiller cooperates. The arm 37 has an extension at its lower end, upon which the swinging detent 43 is mounted. This extension carries two fixed pivot pins 38 and 39. Rotatable about pivot pin 38 is a link 41 having an eye surrounding the pin 38, and a second eye surrounding a pivot pin 42, which pin also extends through detent 43.

Pivotally mounted about the pin 39 is a rod 44 pivoted at 45 to the detent 43 and having an extension pivotally connected at 47 to the core 46 of a solenoid 48. The solenoid is carried by an extension on oscillating arm 37 and may be enclosed in a suitable water and sound proof housing 60. The relay for controlling the solenoid is carried by the extension as here shown, but in practice it may be otherwise located as convenience may dictate. The extension 46, together with the detent 43, is biased to the upward position by a spring 49 connected between the rod 44 and the body of the oscillating arm extension.

It will be seen, therefore, that when the solenoid is deenergized, the detent 43 is disengaged from the ratchet teeth 32 of plate 29. When the solenoid 48 is energized, the tooth 33 of detent 43 is brought into the space between ratchet teeth 32 with which it is in alignment. Inasmuch as the solenoid together with the detent are all carried by the extension of oscillating arm 37, it will be obvious that the point of engagement between the ratchet teeth 32 and the detent 43 depends upon the relative position of detent 43 and plate 29 at the time the solenoid is energized.

The quadrant with which the tiller just described cooperates, is pivoted about the bracket 22 by any suitable means. As here shown, this means comprises a hinge pin 51 passing through an extension 52 of the bracket 22. The quadrant is of approximately segmental shape and carries two spaced extensions 53 and 54 (Fig. 5) which surround the hinge pin 51 to complete the pivotal connection between the tiller and quadrant.

The arcuate face of this quadrant carries the usual cable tracks 55, formed by ribs 56. It also carries two opposed perforated side bosses 57 to which adjustable eye-bolts 58 are secured by nuts 59. These nuts are adjustable to vary the tension of the steering cables connected to them.

Mounted on the upper face of the arcuate portion of the quadrant is a latch mechanism adapted for cooperation with the latch openings 34 in the arcuate latch plate of the tiller. This latch comprises a bent arm 61, pivotally connected to the quadrant at 62 and having an enlargement 63 midway between its ends, which enlargement carries the latch tooth 35, previously referred to. The end of the arm 61 remote from the enlargement 63 and pivot 62 is free to move, except as it is restrained by the engagement of the inner surface of its hollow triangular extension 64 with a cooperating pin 65, later to be described.

The top face of the quadrant also carries a flat leaf spring 66 fixedly secured to it at points 67 and 68 and engaging the enlargement 63 of the bent arm midway between these two points of connection. It will thus be seen that the latch tooth 35 is biased inwardly toward the latch plate 29 and that this tooth will enter the opening 34 with which the tooth is in alignment, unless the bias of the spring 66 be overcome by movement of pin 65 within the extension 64. If the latch tooth 35 enters one of the latch openings 34, the tiller and quadrant will move together and the rudder may be moved by manual means, in the usual way.

Mounted on the quadrant at one side thereof, is a worm gear assembly adapted to be positively driven from a motor 69 connected to it through a flexible cable 71. The motor may also be mounted directly on the quadrant as shown in Fig. 16. Pivotally mounted at the side of the quadrant on a boss 72 carrying a hinge pin 73, is a housing having a ring shaped portion 74, within which the worm gear assembly is mounted. The portion 74 has an extension 75, from the extreme end of which depends the pin 65 which cooperates with the triangular opening in extension 64 of bent arm 61. The portion 74 receives a worm gear housing 76, comprising a worm 77 mounted on a rotatable shaft 78 connected to the flexible drive 71 and supported in suitable bearings. The worm 77 meshes with a worm gear 79, rotatably secured to a vertical shaft 81 within the housing 76.

The lower end of shaft 81 is adapted to receive an eccentric disc 82 containing a plurality of openings 83, any one of which may be employed to secure different crank stroke arrangements. The eccentric disc is secured to the shaft by a key 80 and screw 84, and carries an enclosing face plate 85 secured to it by a screw 86. A pitman head 87 surrounds the eccentric disc 82 and is connected to a pitman 88. The remote end of pitman 88 is pivoted to the oscillating arm 37 by a pivot pin 89 locked in place as by a tapered pin 91.

When the motor 69 is in operation, the worm 77 will rotate to cause slow rotation of the worm gear 79 together with the eccentric carried on the worm gear shaft. Hence the pitman 88 will be swung back and forth carrying with it the arm 37, together with the solenoid 48 and detent 43.

This movement can take place freely so long as solenoid 48 is deenergized, and detent 43 is disengaged from the ratchet teeth. When, however, the solenoid is energized to bring the detent 43 into engagement with the ratchet teeth of latch plate 29, movement of the arm 37 will result in movement of the tiller, and hence of the rudder to which the tiller is fixedly connected. While the angular movement of arm 37 is small, the extent of rudder movement will depend upon the point of engagement between detent 43 and ratchet teeth 32, and the duration of such engagement.

In the example given, impulse steering takes place throughout the range substantially corresponding to the distance between latch openings designated 34R and 34L, or through an angle of approximately 7½° on either side of the course.

Beyond this range, fixed rudder steering is employed.

Inasmuch as the worm gear assembly is constantly driven by the motor, means must be provided for disengaging the detent 43 at the proper time, and holding the tiller in displaced position through the period that fixed rudder is desired. It is also necessary that means be provided for locking the tiller to the quadrant for hand steering. The latch tooth 35, together with the latch plate 29, performs both of these functions. This latch must be operative at all times when the detent 43 is disengaged; must be inoperative when the detent is engaged, and must operate in such a way that the latch and detent will never be simultaneously operative, even for the most minute instant of time.

As previously described, the bent arm 61 of the latch is pivoted at 62 and is normally biased inwardly to latch engaging position by spring 66. However, the worm gear assembly is swingable about the pivot 73 on the quadrant. When, therefore, detent 43 is disengaged from the ratchet teeth, rotation of the worm gear 79 in a clockwise direction causes periodic oscillation of the arm 37 and the parts connected with it.

When this takes place, the torque exerted on the worm gear housing is such as to exert substantially no turning moment on the extension 75; hence the parts assume the position shown in Fig. 2, wherein pin 65 is in engagement with the V-shaped portion of the opening in extension 64, and spring 66 holds the latch tooth 35 against the latch plate 29 or in the opening with which this tooth is in alignment.

At the instant, however, that detent 43 is moved against the ratchet teeth by energization of solenoid 48, the resistance to movement of the eccentric causes the worm gear housing to rotate slightly about 73, thereby causing pin 65 to ride along one of the inclined faces of the opening in extension 64 and swinging the arm 61 away from latch plate 29 about pivot 62 and against the pressure of spring 66, thereby disengaging the latch tooth 35 from the latch plate or opening 34 with which it was in engagement.

It will be seen, therefore, that with the parts thus arranged, the latch tooth 35 will always be biased by spring 66 toward the latch plate 29 whenever the solenoid 48 is deenergized to move the detent 43 away from the ratchet teeth. It will also be evident that whenever the solenoid 48 is energized, the latch tooth 35 will be moved away from the latch plate and will be held there until the solenoid is deenergized again.

The tiller and quadrant construction just described is suitable for operation in any system in which the rudder actuating mechanism is subjected to periodic impulses in response to a course setting device, such as a magnetic or gyroscopic compass.

One form of device for which it is well adapted is one in which there is associated with a magnetic compass an adjustable control head embodying an electric contact device which is arranged to follow the moving element of the compass, either magnetically or otherwise, and thereby adjust the position of the electric contactor which is periodically actuated to energize proper circuits of rudder actuating or controlling mechanism.

One example of control mechanism of this type is described and claimed in my copending application, Serial No. 412,418, filed December 7th, 1929, to which reference may be had for a full disclosure of details. For the purpose of this application, it will be sufficient to state that in that application a rotatable electric contact arm is at all times magnetically coupled to the moving element of a compass, but out of mechanical engagement with it. A solenoid periodically lifts the contact arm so that its two ends engage contacts carried by a ring above the arm, in which ring are embedded electric contacts for completing circuits as the contacts are engaged by the contact arm.

The method, therefore, embodies the principle of moving a contactor into contact with selected contacts of a series according to the changing indications of a movable indicating member, and consists in shifting the contactor alternately into positioning engagement with the indicating member, and out of such engagement into contact with one of a series of contacts selected by such positioning.

In order to make use of the principle set forth above, to control the periodic energization of the contact lifting arm of the compass, and to determine the periods of energization of the solenoid 48 to control the movements of the steering mechanism, various electric switching devices must be employed.

For the sake of convenience, the motions which are necessarily performed by the moving parts of the apparatus, such as the worm gear shaft, and relative movement between the tiller and quadrant, are utilized for controlling the positioning of the electric switches. One set of these switches is mounted on the top tiller plate 26, while the other one is mounted on top of the worm gear assembly.

It will be understood that the exact location of these switches has been chosen herein to facilitate access and adjustment, but that other locations may be found to be suitable. Hence it is not intended that the invention be limited to the details described herein, other than as such limitations are imposed by the prior art.

Apart from the contactor carried by the magnetic compass, there are in the present arrangement six rotating switching devices, three of which are mounted on top of the tiller plate, and three of which are mounted on, and rotate with the vertical shaft of the worm gear 81.

Figure 5:
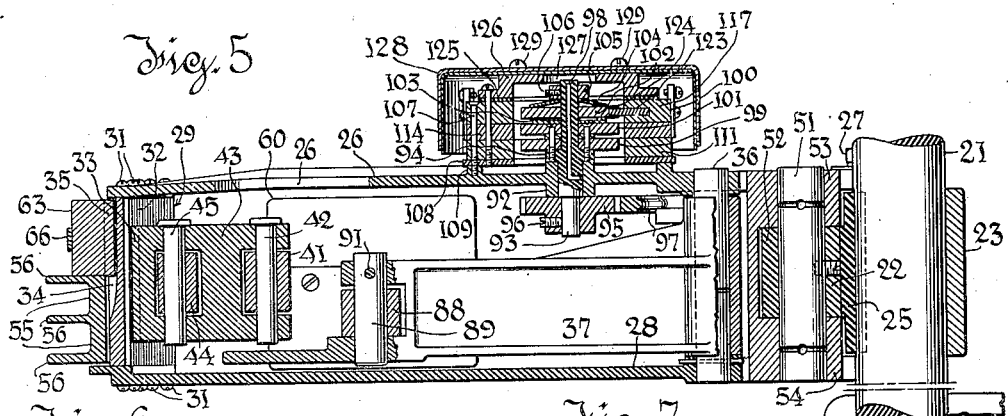
Fig. 5 is a vertical section taken substantially on the line V—V of Fig. 2.
Figure 6:
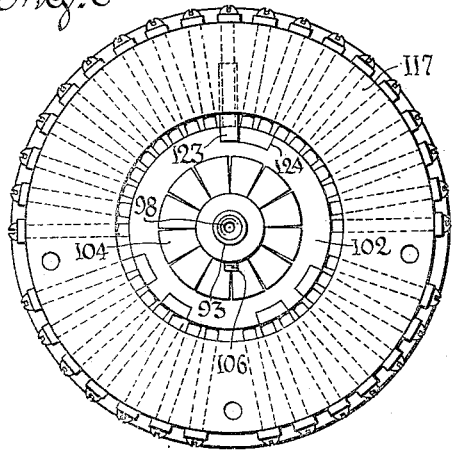
Fig. 6 is a plan view of the circuit controlling mechanism of Fig. 5, with the protective cap removed.
Figure 7:
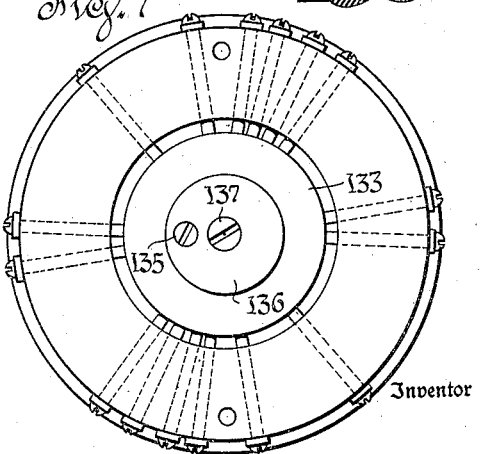
Fig. 7 is a plan view of the circuit controlling devices of Fig. 4, with the protective cap removed.

As seen in Figs. 5 and 6 of the drawings, the top tiller plate 26 carries an integral sleeve 92 in which is rotatably mounted a shaft 93 having a central flange 94 abutting the top of sleeve 92. The extension 93 carries a gear 95 permanently secured to it as by a set screw 96, and this gear meshes with a toothed segment 97 secured to the quadrant in the manner shown in dotted lines in Fig. 2. Consequently, when the tiller moves relatively to the quadrant, the gear 95 is caused to rotate and, thereby, to actuate the shaft 93 in one direction or the other by a small amount. This actuation, of course, occurs only when the detent 43 is in engagement with one of the ratchet teeth so that the tiller moves with the swinging arm 37 as it is oscillated by the pitman.

The shaft 93 has a reduced upwardly extending portion and contains an oiling opening 98 through which oil may be supplied to the bearing surface between shaft 93 and sleeve 92. The reduced portion of the shaft carries a plurality of spaced circuit controlling devices, designated 99, 101 and 102.

The disc 99 abuts the flange 94 on shaft 93 and is spaced from the disc 101 above it by a suitable separating washer. The two discs are secured to flange 94 by screws, as shown. Above the disc 101 is a friction washer 103 composed of cork or similar material, which is in engagement with both discs 101 and 102. This frictional engagement is secured through a spring washer 104 fixed under tension by a collar 105 secured to the shaft as by a set screw 106.

The discs 99, 101 and 102 are surrounded by a housing composed of insulating annuli secured to the top tiller plate and each containing radial openings to receive brushes cooperating with the respective discs and forming parts of electric circuits. All of these annuli are held in fixed relation to one another and to the top tiller plate in any suitable manner, as by screws 107. 108 designates an annular washer secured to an upstanding flange 109 on the tiller plate and forming a base for the three annuli containing brushes cooperating with the three circuit controlling discs. The bottom annulus, designated 111, contains nine brushes cooperating with two spaced conducting segments 112 and 113 on disc 99. (See Fig. 8.) One of the brushes, designated O, cooperates with a centering switch, which will be described hereinafter.

The bottom disc 99 is the fixed rudder controller, and in this specification will be designated, for the sake of brevity FRC. The details of this circuit controlling device, as well as of the others to be described later, may be observed by referring to the diagrammatic views shown in Figs. 8, 8a and 8b, and using them in conjunction with Figs. 5 and 6.

The function of the FRC is to determine the angles and periods over which the rudder is to be held in deflected position, and its circuits are energized in accordance with the indication of the compass or other direction controlling device on the craft. The brushes of this controller are, therefore, designated according to the corresponding compass control contacts.

The second or middle annulus, designated 114, contains two brushes which cooperate with two short segments 115 and 116 in the insulating disc 101. This middle disc is a centering switch and its function is to control the circuits in such a way that when the automatic control is shut off, the latch tooth 35 will engage the central opening 34, thereby centering the tiller with respect to the quadrant. In this description, this switch will be designated CS.

The top annulus 117 contains six brushes cooperating with two short segments 119 and 121 in top disc 102. In Fig. 8, additional segments 118 and 122 are provided for cooperation with additional brushes, if it is desired to use them. The movement of this disc, which functions as a change-over switch, operates to cause the impulse rudder range of steering to be increased as the craft approaches its course, and to be decreased as the craft leaves its course. In this description, this switch will be designated CO. Its movement is limited by a pin 123 carried by the annulus 117 and cooperating with a slot 124.

Since disc 102 is loose on shaft 93, it is moved only by the friction between it and the middle disc 101 caused by the intermediate friction washer 103. Therefore, as disc 101 rotates, it carries disc 102 with it until the pin 123 engages one side or the other of slot 124.

Above the top annulus 117 is a washer 125, and above this a top plate 126, having a central opening 127 affording access to the oiling device when the protective cap 128 is removed. This cap 128 has a depending skirt and is held in position on the member 126 by screws 129. The depending skirt is so arranged that dirt and moisture are excluded from the electric contacts.

The switching devices carried by the worm gear housing will now be described. The shaft 81 has a reduced projecting portion at its upper end and on this are mounted three insulating discs 131, 132 and 133. These discs are separated from one another by washers 134 and are all secured in fixed relation by a screw 135 passing through a top disc 136, as well as each of the circuit controlling discs and the spaced washers associated with them. The top disc 136 is also secured to the end of shaft 81 by a screw 137.

The top of the housing within which the worm gear assembly is mounted carries a perforated washer 138, upon which are placed, one above the other, a plurality of insulating annuli 139, 141 and 142. These annuli contain radial openings for the reception of spring pressed brushes, to which electrical connections may be made by brush connectors 100.

The annulus 139 associated with the bottom or timer disc 131 has two diametrically related brushes which cooperate with two conducting segments 145 and 146 in the timer disc 131 (see Fig. 8), and these segments are electrically connected together by a wire 147.

The function of this disc, which will be designated T hereinafter, is to control the actuating mechanism of the contact-making device carried by the direction controller or compass. In other words, it controls the periods of energization of the whole system, because no control circuit can be energized except through contacts carried by the direction controlling device or compass. Accordingly, the periodicity of the rudder impulse is dependent upon the speed of rotation of T, and the duration of the rudder impulses is dependent upon the angular extent of the contact segments 145 and 146.

In the apparatus shown herein, the speed of rotation of the worm gear is such that the timer completes the lifting coil circuit of the compass twice during each revolution of the worm gear, and these points of energization are near the extreme end positions of the pitman 88.

The middle annulus 141 contains four brushes connected to brush connectors, and these brushes are adapted to at times contact with a conducting segment 148 (see Fig. 8) carried in the middle insulating disc 132, constituting a selector. The function of this selector is to cause energization of the solenoid 48 at the proper position so as to cause right or left movement of the tiller in accordance with the actuating circuits set up by the compass controlled contacts and the contacts of FRC. The pitman 88 moves to the right, as seen in Fig. 2, to put on right rudder, and to the left to put on left rudder. The selector only allows the solenoid 48 to be energized on right hand crank movements when right hand compass contacts are in circuit, and on left hand crank contacts are in circuit, and on left hand crank movements it only allows the solenoid to be excited when left hand compass contacts are in circuit.

The top annulus 142 is associated with the top or impulse controller disc 133 and contains eight brushes adapted to complete circuits with conducting segments 149 and 151 in the disc 133 at the proper time. (See Fig. 8.) The segments 149 and 151 are each of approximately 150° in extent, and symmetrically related one to the other. The disc 133 functions as an impulse controller and will be designated IC as it is referred to in the specification. The purpose of this impulse controller is to control the time of excitation of the solenoid 48 when a contact at either side of the center on the compass controlled device is in circuit.

On top of top annulus 142 are insulating and sealing washers 152 and 153, respectively, which are held in place by a top plate 143 suitably hollowed out to provide clearance for the screw 137. Secured to the top plate 143 is a cover cap 144 having a depending annular flange which extends well below the brush connectors associated with the various annuli to protect them from dirt, moisture and mechanical damage. It will be obvious that by removing this cover cap, access may be had to the various brush connectors so as to change their position and alter the steering characteristics of the circuits.

In Fig. 8 of the drawings, all of the circuit controlling devices are illustrated diagrammatically in relation to the eccentric, the solenoid, remote control switch and the compass controlled contact arm.

It will be observed from the arrows, that the T, S and IC discs rotate in one direction, since they are permanently secured to the shaft with the worm gear 79 and rotate with it.

In similar manner, the double arrows applied to FRC, CS and CO, indicate that these switches rotate in either direction depending upon the direction of rotation of gear 95 in response to relative movement between the tiller and quadrant.

In this figure, the compass controlled contact arm, designated 154, is shown above the contacts with which it cooperates. It will be understood, however, that in practice this arm, which is of electrically conducting material and carries a contact button at each end is biased by gravity to a position away from the contacts of the ring 155, into coupling relation with the moving element of the compass. Energization of the lifting magnet coil 156 lifts the arm into contact with the ring and completes circuits in accordance with the position of the arm and of the circuit controlling devices which are included in circuit by engagement of the contact arm and ring.

It will be understood that arm 154 is carried on a pivot which constitutes the core of lifting magnet 156. The contact button carried by one end of contact arm 154 cooperates with a long arcuate conducting segment 157 in ring 155 and this segment is separated from two shorter segments 6R and 6L by sections of insulation, as shown. The space between conducting segments 6L and 6R is divided up into eight conducting segments of varying arcuate extent, four of them being on either side of the center. The segments 1, 2, 3 and 4 on each side are separated from each other by sections of insulation which are of less arcuate extent than the contact button carried by the arm 154. Consequently, this button may engage any two adjacent contact segments on one side of the center simultaneously, but the resultant action will be the same as if only the segment further from the center were engaged.

The contacts 4 and 5, as well as 5 and 6, may be separated from each other by wide sections of insulation, so that the contact button cannot engage both of them simultaneously. As shown, the two contacts 1L and 1R are separated by a section of insulation wider than the button on the contact arm so that both R and L circuits cannot be energized at once. If the inertia of the parts be such that they will operate to return the rudder to amidships position between impulses without being forcibly returned to that position, contacts 1R and 1L may be arranged to be engaged simultaneously and the selector relied upon to select between them, as will be pointed out hereinafter.

When the contact arm 154 is lifted into engagement with the contact ring 155 by energization of lifting magnet 156, the circuit for magnet 156 includes a switch arm 158 mounted on a base 167 and a contact 159 with which this switch arm 158 engages in its left hand position. In its right hand position, the switch arm 158 engages a contact 161 associated with a remote control attachment which will be described later.

The supply of current from the main source of power is controlled by a main switch 162 and when this switch is closed, the motor 69 is energized (Fig. 8). The amount of power required to lift the contact arm 154 is materially greater than that required to hold it in contacting position after it is lifted. Inasmuch as the total time during which it is lifted is large, it is advantageous to reduce the amount of current flowing through the lifting magnet 156 as much as possible. Accordingly, this reduction is brought about by the provision of a relay associated with the solenoid 48, and this relay may be carried on a base 163, as shown diagrammatically in Fig. 8.

This relay comprises a coil 164, a fixed contact 166 and a movable contact 165. When the coil is energized, contact 165 is brought into engagement with contact 166, thereby completing the circuit for solenoid 48, as shown. This relay not only permits the current flowing through the lifting magnet to be greatly reduced after the contact arm is lifted, but also reduces the current flowing through the compass head and controller contacts to a minimum. When the timer circuit is closed, current passes through the lifting coil only over the following circuit (Fig. 8):

Positive terminal of the source of current, main switch 162, wires 168 and 169, switch arm 158, contact 159, wire 171, lifting magnet 156, wire 172, timer brush 173, timer segment 146, wire 147, timer segment 145, timer brush 174, return wire 175, to the negative terminal of the source. This circuit remains energized so long as the brushes 173 and 174 are in contact with their conducting segments, as shown. This timer is so placed as to close the circuit to the lifting magnet just before the pitman 88 reaches its dead-center position, and to break it when it reaches that position, or slightly thereafter.

Unless auxiliary means were provided for completing the circuit through lifting magnet 156, rotation of the timer would result in deenergization of this magnet at the termination of the short interval during which the brushes of the timer engage the conducting segments. Accordingly, the selector 132 is timed so as to complete its circuit during the time that the timer circuit just traced is closed. It is the completion of this selector circuit which results in energizing the relay to complete the circuit of the solenoid 48.

In tracing the selector circuit referred to above, which circuit is closed before the timer circuit is broken, it will be necessary to assume a position for the contact arm of the compass. If the assumption be that the contact arm of the compass engages contact 1R on the compass head, the circuit which is closed to energize the relay and thus the solenoid 48, is as follows:

Positive terminal of the source, switch 162, wires 168 and 169, switch lever 158, contact 159, wire 171, lifting magnet 156, contact segment 157, contact arm 154, contact 1R on the compass head, brush 1R of IC, through contact segment 149 and brush R of IC, wire 182, brush 4R of FRC, segment 112, brush R of IC, brush 177, segment 148 and brush 176 of selector switch 132, wire 183, coil 164 of the relay, and return wire 175 to the negative terminal of the source.

When this circuit is closed, the resistance of winding 164 of the relay is placed in series with the lifting magnet and hence reduces the current through that magnet, thus eliminating the necessity of providing an auxiliary holding coil which is substituted for that of lifting magnet 156 when the contact arm is lifted.

Energization of the relay closes its contacts 165 and 166 to complete a circuit for the solenoid 48. This circuit is from the positive terminal of the source over switch 162, wire 168, winding of the solenoid 48, contacts 165 and 166 of the relay, and return wire 175, back to the negative terminal of the source.

This solenoid circuit remains closed as long as the relay is energized, and is opened immediately upon deenergization of the relay. It will be understood that the solenoid circuit is always closed when the relay is energized, and is always open when the relay is deenergized.

Before tracing the operation of the various circuits of the apparatus, the mechanical operation of the tiller and quadrant will be described.

Since the function of the detent 43 is to connect the tiller with the eccentrically driven means to move the rudder to a position determined by the position of the compass contact arm, the actuation of this detent is dependent upon movement of the craft away from its course, even though such movement be very slight. It will be understood that the latch including tooth 35, is actuated by spring 66 to hold the latch plate in the position to which it is moved by the detent 43 during the period that the detent engages the latch plate.

So long as the boat is within the impulse steering range, the latch tooth 35 may never reach any of the openings in latch plate 29 beyond the central opening 34, and hence the tooth 35 will engage the smooth face of the latch plate until the rudder is moved to central position.

Openings 34R and 34L on either side of central opening 34 on the latch plate 29, are designed to cooperate with latch tooth 35 to hold the rudder in deflected position in the range of fixed rudder steering. If, for example, the craft is departing in a starboard direction away from its course, and continues to move in that direction, the actuation of the tiller will eventually result in the latch plate 29 reaching such a position that when detent 43 is lifted the latch tooth 35 will enter one of the openings 34L, hence the rudder is held in deflected position and the circuits set up are such as to prevent the rudder from returning to its amidships position.

The succeeding energization of the solenoid 48, assuming a still further deflection of the craft from its course, will cause the detent 43 to engage a ratchet tooth beyond the first openings 34L and will move the latch plate to such a position that upon subsequent deenergization of solenoid 48, the tooth 35 will enter the second or third opening 34L remote from the central opening 34.

From this, it will be plain that within the range of fixed rudder steering, the latch functions to hold the tiller in deflected position and that the rudder centering means, including CS is cut out. When the craft completes its swing and starts to return to its course, a reverse operation takes place in that the detent 43 engaging the ratchet teeth moves the latch plate toward its center position, and during each disengagement of the detent, latch tooth 35 engages an opening 34L nearer the center.

When the craft enters the impulse steering range again, the latch tooth 35, of course, is unable to engage the openings 34L and the circuits are set up through the change-over switch to cause the rudder to be returned to its neutral position between impulses.

The return of the rudder to amidships position between impulses is brought about either through the trail of the rudder through the water, or through the centering switch 101 and the zero brush on FRC, or by the combined action of these two. The centering switch is not operative on wide swings of the craft which would energize compass contacts 5 and 6, but it is operative on the 1, 2, 3 and 4 contacts.

It is, evident, therefore, that this centering switch performs its function only in the impulse steering range and not in the fixed rudder steering range.

Since craft are of various types, a few representative structures will be discussed, together with the methods of handling the rudder for each particular type.

*First.*—If the craft is of the twin screw type, or if its steering characteristics are such that the amidships position of the rudder coincides with the center line of the craft, and if the rudder post is not equipped with a stuffing box and is otherwise free from excessive friction, the "trail" of the rudder will return it to the zero position as soon as detent 43 is disengaged from the latch plate.

*Second.*—On craft where there is excessive rudder friction, especially where rudder post stuffing boxes are employed, or on some single screw craft where the amidships position of the rudder must be set at an angle substantially away from the center line of the craft, trailing, on slight rudder angles, will not return the rudder to the zero position and a centering mechanism is employed.

*Third.*—In intermediate cases, the design of the parts may be such that the rudder will be nearly restored to zero position by "trailing" and the final adjustment made by "centering", or it may trail freely back on one side of the center and have to be forcibly returned by centering on the other side of the center. This last condition occurs particularly on single screw craft.

Where the rudder will freely trail to zero position, the compass contacts 1R and 1L can be spaced closely together so that they are simultaneously hit by the contact arm when the craft is exactly on its course, and the rudder given alternate small right and left swings, or "live rudder", which produces the most accurate steering. This method of steering is disclosed and claimed in my prior application, Ser. No. 585,122, filed January 6, 1932.

However, when centering must be employed to bring the rudder to zero, the 1R and 1L compass contacts are separated by insulation so that they cannot be hit simultaneously and the rudder does not then move when the craft is exactly on its course. This constitutes "dead rudder" steering.

As shown in Figs. 8 and 15, the compass head is constructed for "dead rudder" steering and the rudder is returned to zero forcibly. It will be understood that the compass head may be so constructed that contact arm 154 may engage both 1R and 1L simultaneously and any arrangement mentioned above may be employed depending upon the characteristics of the craft to be steered.

In order to simplify the explanation, the remaining circuits in the apparatus will be traced in connection with typical craft movements which will be assumed. The first assumption will be that the compass head has contacts 1R and 1L close together, and that the craft is on its course, under which conditions the contact arm 154 will engage periodically both the compass contacts 1R and 1L. With the apparatus arranged as shown, the rudder will be subjected to a right deflection when the contact arm strikes contact 1R and 1L and will thus trail back to zero; and a left deflection when the contact arm strikes contact 1R and 1L subsequently, the control being accomplished over the contacts of the selector.

Following the above assumption, the circuit completed when the contact arm 154 strikes compass contact 1R will be traced. The parts are shown in Fig. 8 of the drawings in the positions which they would occupy at the time the circuits were energized to apply right rudder within the impulse steering range, and show the selector circuit closed and the timer circuit closed but just at the point of being opened. This is evident because the selector has its conducting segment 148 bridging the contacts 177 and 176 controlled by the right compass contacts; whereas the circuit controlled by the left compass contacts is open between brushes 178 and 179 of the selector.

The circuit completed by engagement of contact arm 154 and contact 1R with switch 162 closed, is as follows:

Positive terminal of the current source, switch 162, wires 168 and 169, switch arm 158, contact 159, wire 171, contact arm lifting magnet 156, compass segment 157, contact arm 154, compass contact 1R, brush 1R of IC, segment 149 and brush R of IC, wire 182, brush 4R of FRC, segment 112 and brush R of FRC, brush 177, conducting segment 148 and brush 176 of the selector, wire 183, winding 164 of the relay, and return wire 175, to the negative terminal of the current source.

It will be understood that this circuit is established while the timer circuit traced above is closed, but just previous to its opening. When this circuit is completed, solenoid 48 is energized to bring the detent 43 into engagement with one of the openings between ratchet teeth 32. Consequently, the pitman 88 in moving to the right will carry with it the tiller, because latch tooth 35 will be disengaged from the latch plate 29 as soon as the solenoid 48 is energized to bring the detent into engagement with the ratchet tooth with which it is in alignment.

The tiller will, therefore, be moved to the right in Fig. 2 to apply right rudder, and the amount of this movement will be determined by the length of time required for IC to rotate and break the circuit between brush 1R and segment 149 of IC. When this circuit is broken, the solenoid 48 will be deenergized and, likewise, the relay. Detent 43 will be released so that it will swing freely, and latch 35 will be released by pin 65. The rudder is now free to trail and the water pressure on it as it trails through the water, brings it back to the zero position before the right hand movement of pitman 88 is completed. Latch 35 snaps into latch plate notch 34, holding the tiller at the zero position. The rudder will then remain at the zero position until the contact arm 154 is lifted again and the selector takes a position where it will energize the circuit over compass contact 1L. When the parts move thus, the circuit completed through contact 1L of the compass head is as follows:

Positive terminal of the source, switch 162, wires 168 and 169, switch arm 158, contact 159, wire 171, lifting magnet 156, compass head contact segment 157, contact arm 154, compass contact 1L, brush 1L, conducting segment 151, and brush L of IC, wire 184, brush 4L of FRC, segment 113 and brush L of FRC, brushes 179 and 178 and segment 148 of the selector, wires 185 and 183, winding 164 of the relay, and return wire 175, to the negative terminal of the source.

This circuit will be closed until the trailing end of conducting segment 149 passes the brush 1L. So long as this circuit is closed, the solenoid 48 is energized to hold the detent 43 against a ratchet tooth 32 and to cause movement of the tiller to the left in Fig. 2, thereby applying left rudder. When the circuit is opened, the trail of the rudder through the water will return the rudder to the zero position.

It will be understood that so long as the craft is on its course and the compass contact arm 154 continues to hit the contacts 1R and 1L simultaneously, the rudder will be subjected to alternate deflections to the right and left, with trailing intervals between these deflections, in which water pressure returns the rudder to the zero or amidships position. This is a "live" rudder condition and has been found to give the craft a steadier movement than when the rudder is held stationary with the craft on its course.

When the compass contacts 1R and 1L are separated so they cannot be hit simultaneously, the rudder is not subject to alternate movements when the craft is on its course, and the rudder is held at the amidships position by latch 35 and slot 34.

If, due to friction or side water pressure from a single screw propeller, the rudder will not return to the zero position by "trail", it is forcibly returned by the centering mechanism.

It will now be assumed that the tiller has been moved to the right and that friction prevents the trailing pressure on the slight rudder angle from returning the rudder to the zero position. At this time, the brushes 186 and 187 of the centering switch will engage the conducting segment 115 and the position of FRC will be such that segment 113 will bridge brushes O and L. Upon completion of the half revolution of the worm gear, conducting segment 148 of the selector will bridge brushes 178 and 179 to complete the centering switch circuit which, therefore, will function to return the rudder to amidships position.

The completed circuit thus closed is: From the positive terminal of the source over switch 162, wires 168 and 169, switch lever 158, contact 159, wire 171, lifting magnet 156, wire 172, brushes 186 and 187 and conducting segment 115 of CS wire 188, brushes O and L and conducting segment 113 of FRC, wire 189, brushes 179, 178 and conducting segment 148 of selector, wires 185 and 183, winding 164 of the relay, and return wire 175 back to the source.

This circuit is completed until return movement of the tiller causes FRC to bring the insulating section in alignment with brush O, thereby opening this circuit and deenergizing the relay and solenoid.

Inasmuch as the circuits utilized when the compass contact arm engages contacts 2L, 3L and 4L, and 2R, 3R and 4R, are similar to those traced when the arm contacts 1R and 1L, it is believed that the operation will be understood without tracing these circuits in detail. All of these contacts are within the impulse steering range, and the manner of operation is similar to that just described, except that as the contact arm 154 swings further from its zero position, the rudder deflections are larger because the periods of energization of solenoid 48 are longer.

On rudder angles given by contacts 2, 3 and 4, the rudder may return to the zero position wholly by "trail", partly by trail and the centering contact, or wholly by the centering contact depending on friction and condition of water currents set up by the propeller. Trailing, of course, becomes more effective with wider rudder angles.

In order to make the operation of the system in the fixed rudder range understood, it will be assumed that the craft swings away from its course through an angle in excess of 10° and such as to bring the contact arm 154 into engagement with compass contact 5R. It will also be assumed that the timer circuit is closed and the selector has rotated to a position in which the relay is energized to cause energization of the solenoid circuit, thereby bringing detent 43 in a position to fasten the swinging arm 37 to the tiller.

A circuit will then be completed from the positive terminal of the source over switch 162, wires 168 and 169, switch arm 158, contact 159, wire 171, lifting magnet 156, compass contact segment 157, contact arm 154, compass contact 5R, wire 192, 5R brushes and segment 119 of CO, brush 5R, segment 112 and brush R of FRC, brushes 177, 176 and contact segment 148 of the selector, wire 183, winding 164 of the relay and return wire 175, back to the source.

Movement of the eccentric with this circuit closed will cause the tiller, and with it the rudder, to be swung through a substantial angle corresponding to the deflection of the craft, and the circuit just traced will be deenergized when the selector passes brush 177 associated with segment 148. When this deenergization takes place, the latch 35 holds the tiller in deflected position.

If, at the time of the next compass contact, 5R is hit again, the circuit will not be reestablished as it is broken by the insulated strip between segments 112 and 113 on FRC being opposite 5R. The tiller will thus be held by the latch as long as 5R is struck.

When sufficient time has elapsed to cause the swing to be checked and the craft to start toward its course and energize one of the contacts 1, 2, 3 or 4R, the circuits established will be similar to those traced over compass contact 1R and the centering switch will again function to return the rudder to neutral position between successive deflections.

Inasmuch as a craft movement calling for left rudder when compass contact 5L is in circuit results in the completion of circuits similar to the circuit just traced, except that the L contacts of the compass, FRC, CO switch and selector are substituted for the R contacts, it will not be necessary to trace these circuits in detail.

As shown in the drawings, in the particular instance cited only the compass contacts 5 and 6 are employed in the fixed rudder range and although provisions are made for using as much as 20° of rudder, it has been found in practice that rarely if ever will the amount used exceed 15°; hence two right and two left contacts within the fixed rudder range will generally be sufficient for accurate steering.

The fixed rudder range may be varied according to the steering characteristics of the craft on which the system is employed, but as here shown compass contacts 5 and 6 only are included in this range. As contact 5 is connected by the changeover switch to 4R, on reversals of helm impulse steering is begun when the craft starts to swing toward its course and the contact arm passes from 6 to 5, at a greater angle of deflection than that at which fixed rudder steering began during the outward swing away from the course.

The purpose of this arrangement is to stabilize the steering and to prevent the craft from overswinging the course upon its return. With other methods of steering where the rudder is continuously held on, there is nearly always the tendency for the craft to overswing its course, thus necessitating a pronounced movement of the craft along a sine course before the yawing tendency of the craft is entirely overcome.

Since the circuits which will be completed for movements of the craft off the course sufficient to energize #6 contacts of the compass will be substantially similar to those for the #5 contacts, it will be unnecessary to trace them in detail. However, in order to facilitate an understanding of the operation of the entire system, a complete movement of all the parts during one severe swing of the craft away from its course and back again will be analyzed.

In making this analysis, it will be assumed that the compass is equipped with a wide center contact, as shown in the drawings, and that the craft is in a heavy following sea which causes it to yaw badly and that it is swung in a port direction 15° or more off its course, so that the movement of the contact arm 154 of the compass is extreme enough to cause it to engage contact 6R on the compass head. In order to make the analysis as complete as possible, it will also be assumed that in swinging away from its course the craft movements are such that each contact of the compass head on the right is engaged at least once and that on the return swing toward the course, each of the contacts will be engaged at least once.

As the craft swings away in a port direction, and the timer circuit is closed to energize the compass lifting magnet 156, contact arm 154 engages contact 1R. This completes a circuit previously traced and results in energization of the relay and in turn the solenoid 48, thereby moving the detent 43 into engagement with a ratchet tooth on the left hand side of the center shown in Fig. 2, thus causing the tiller and together with it the rudder to be swung to the right through a small angle of approximately 3°, as shown.

When the IC rotates to break this circuit and deenergize the solenoid 48, the detent 43 is disengaged and the rudder is caused to return to its amidships position through trailing or the action of the centering switch, in conjunction with the O contact of FRC. If the latter, inasmuch as the rudder movement responsive to energization of contact 1R was a right movement, restoration of the rudder to amidships position must be brought about through movement of the rudder to the left. To accomplish this, the contact segment 148 of the selector will be in position to bridge the brushes 178 and 179, and the O brush of FRC will be in engagement with the conducting segment 113 and connected with the L brush of FRC.

In restoring the rudder to amidships position, the circuit completed will be as follows: From the positive terminal of the source, through switch 162, wires 168 and 169, switch arm 158, contact 159, wire 171, lifting magnet 156, wire 172, brushes 186 and 187 and contact segment 115 of the centering switch, wire 188, O brush, contact segment 113 and L brush of FRC, wire 189, brushes 179, 178 and contact segment 148 of the selector, wires 185 and 183, winding 164 of relay and return wire 175, back to the source.

The duration of the time during which this circuit is closed is dependent upon movement of FRC back to a position where the insulation between conducting segments 112 and 113 is in alignment with brush O, thereby resulting in a breaking of the centering switch circuit.

The circuit is closed for this return movement of the rudder only after a trailing period of the rudder following deenergization of the lifting magnet 156, subsequent to the right deflection given to the rudder when the compass arm strikes contact 1R. During this period the selector segment 148 after breaking its circuit at brush 177, must move to complete the CS circuit at brushes 178 and 179.

Subsequent to return of the rudder to its amidships position, and after deenergization of lifting magnet 156, the contact arm 154 follows the swing of the compass in response to the continued swing of the craft in a port direction until energization of lifting magnet 156 occurs again. The timer closes the circuit through compass contact 2R to energize the relay and solenoid 48 to bring detent 43 into engagement with the ratchet teeth of latch plate 29, and this time gives the rudder a movement of approximately 5°.

As soon as the selector breaks the circuit, the solenoid 48 is deenergized and at a short interval thereafter the timer circuit is again closed to establish the centering switch circuit previously traced, and thereby to return the rudder to amidships position again, whereupon the contact arm 154 is dropped until the timer circuit is reclosed for the next rudder deflection in response to the positioning of the contact arm 154. As this arm moves to engagement with compass contact #3, a circuit similar to that just traced for #2 is closed, and the rudder is returned to amidships position by the centering switch circuit, as before, but the rudder deflection is approximately 6° to 7°.

The same result takes place when arm 154 engages compass contact #4, but the rudder deflection is again increased, this time to 7½°. Following the rudder deflection, the centering switch circuit is closed and restores the rudder to its amidships position.

When the compass contact arm strikes contact #5R, the following circuit is completed: From the positive terminal of the source over switch 162, wires 168 and 169, switch arm 158, contact 159, wire 171, lifting magnet 156, compass contact ring segment 157, arm 154, compass contact 5R, wire 192, both 5R brushes and contact segment 119 of CO switch, brushes 5R and R and conducting segment 112 of FRC, brushes 177 and 176 and contact segment 148 of selector, wire 183, winding 164 of relay, and return wire 175, back to the source.

This circuit remains closed so long as the selector conducting segment engages the brushes 177 and 176 or until broken at 5R on FRC. It will be noted that this circuit includes the change-over switch so that in case the craft starts to return to its course, the period of impulse steering will be begun at a position of greater rudder deflection than that at which it terminated during the outward swing of the craft.

Energization of the circuit just traced results in the tiller being moved far enough so that upon deenergization of solenoid 48, latch tooth 35 engages latch plate opening 34R and prevents the rudder from returning to amidships position before it is given another swing. In other words, the rudder is now held at a 10° deflected position. Energization of the compass contact 6R results in the closure of a circuit similar to that just traced to give the rudder an additional 2½° deflection, which will be maintained by engagement of latch tooth 35 with one of the openings 34R still further from the central position, but the circuit will not include the change-over switch, since this switch operates only on contact #5 under the connections assumed.

It is at contact #5 that the transition takes place between fixed rudder and impulse steering, and since contact #6 is beyond this range, it is unnecessary that the circuit over this contact include the CO switch.

In order to facilitate understanding of the operation when contact #6R is met, the circuit on the contact will be traced. This circuit is from the positive terminal of the source over switch 162, wires 168 and 169, switch lever 158, contact 159, wire 171, lifting magnet 156, compass head conducting segment 157, arm 154, compass contact 6R, wire 193, brushes 6R and R and conducting segment 112 of FRC, brushes 177 and 176, conducting segment 148 of the selector, wire 183, relay winding 164, and return wire 175, back to the source. When this circuit is energized, the centering switch circuit is not rendered operative because this is in the fixed rudder steering range and the rudder is not returned to amidships position before its next deflection.

It will be assumed that the series of rudder deflections just enumerated will result in stopping the swing of the craft away from its course, and that it now starts to swing in a starboard direction toward its course. When the compass contact 5R is hit on the return swing, the rudder is thrown to the left as 5R on FRC registers with the left segment 113. This reverses the direction of rotation of FRC and moves the change-over switch in a counter-clockwise direction, causing segment 119 of CO to connect 5R with 4R which is in the impulse rudder range.

The result of this is to cause operation of the centering switch to be resumed so that the rudder is returned towards the amidships position. On the outgoing movement of the craft, the contact 5R was included in the fixed rudder steering range, but on the return movement it is in the impulse range.

Subsequent energization of the circuits associated with compass contacts 4R, 3R, 2R and 1R, until the craft is returned to its course and the small alternate right and left rudder deflections resumed, is brought about by succeeding rudder deflections corresponding to the spacing of each of these contacts, with trailing intervals between the deflections. During these intervals the centering switch operates to return the rudder to amidships position in the same manner as that described in connection with the departure of the craft from its course.

It will be understood that the operations just described are carried out automatically by compass movements when switch 162 is closed, and switch arm 158 engages contact 159. For purposes of convenience, and particularly when a small craft is being operated by one man, it is convenient to have means for controlling the craft from positions other than those adjacent the compass and pilot wheel. Accordingly, there is attached to the compass through flexible cables a switch, here shown as comprising a base 167 on which the switch arm 158, previously referred to, is mounted.

When this switch arm engages contact 159, the control is all exerted through the compass. If, however, it is desired to exercise remote control, as when the operator goes to a point on the craft remote from the compass, he carries the switch with him and places the switch arm 158 in engagement with contact 161, thereby including in the circuit a switch 195 which may occupy any one of three positions.

In the position shown in Fig. 8, the switch arm 195 is connected by a wire 194 to the centering switch circuit and, hence, this remote control attachment may be used to restore the tiller to its amidships position with respect to the quadrant when the automatic control is to be shut off.

Although it may under some circumstances be desirable to provide means for exercising graduated control of the rudder movements from a remote point, it will for most purposes only be necessary to exercise control under emergency conditions calling for a substantial and sudden movement of the craft. Consequently, there are here shown only two contacts 196 and 198 with which the switch arm may connect. Contact 196 for right rudder movements is connected through wire 197 to wire 193 associated with compass contact 6R. This wire 193 also connects to brush 6R of the fixed rudder controller. Consequently, when switch arm 195 engages contact 196 to the effect upon the circuits is the same as it would be if compass contact arm 154 engaged the contact segment 6R. Similarly, contact 198 for left rudder movements is connected by wire 199 to the left compass contact 6L by wire 200, and also to brush 6L of FRC. It will be obvious, therefore, that by moving switch arm 195 to either of the 196 or 198 positions, extreme rudder movements can be made either to the right or to the left to change the craft from its set compass course in emergencies when the operator is away from his post.

The circuit shown in Fig. 8 shows four stages of impulse and two stages of fixed rudder. By suitably changing the position of the contacts, other arrangements can be had, as:
1. All fixed rudder—no impulse rudder.
2. 5 stages fixed rudder—1 stage impulse rudder.
3. 4 stages fixed rudder—2 stages impulse rudder.
4. 3 stages fixed rudder—3 stages impulse rudder.
5. 2 stages fixed rudder—4 stages impulse rudder.
6. No stages fixed rudder—6 stages impulse rudder.

Likewise, by adjusting the number of segments and brushes on the change-over switch any desired change of range between impulse and fixed rudder can be had, or the rudder can be put on on one set of stages of fixed rudder and taken off at another.

For instance, the following arrangement can be used. Putting rudder on by contacts 1 and 2 in the impulse range and contacts 3, 4, 5, 6 as the fixed range, and then taking rudder off employing only contact 6 in the fixed range and 5, 4, 3, 2, 1 in the impulse range.

This arrangement provides a very simple and convenient means for varying the steering characteristics to suit the particular steering qualities of the craft, without change in the structure of the machine.

The operating mechanism just described is suitable for installation on all craft of lengths between 50 and 150 feet, and by small changes in design may be adapted for craft of greater length where steering engines are employed.

Where the system is installed on small craft, say from 30 to 50 feet, there may be conditions where the response of the craft is so quick that a simpler control system embodying a smaller number of mechanical parts may be utilized. One example of a modified and simplified construction is illustrated in detail in Figs. 9 to 15 of the drawings, and while the system there shown corresponds substantially to that just described, the circuit controlling devices carried by the tiller plate have been replaced by electrical contact segments installed on the quadrant and cooperating with brushes carried by the latch plate. Also the circuit controlling discs actuated from the worm gear assembly have been simplified and their functions absorbed by a single disc which performs the functions of the impulse controller, the selector and the timer.

The face of this disc carries silver-plated contacts cooperating with fixed brushes. The functions of the centering switch and fixed rudder controller are absorbed by the contacts carried on the quadrant and are controlled in accordance with relative movement between the quadrant and tiller. Since there is only one contact in the fixed rudder range and even if more are employed, a change-over switch is not necessary in handling small mobile craft for which the modified system is especially adapted.

In the following description, reference characters in the simplified apparatus have been used to correspond to those previously used, so far as practicable, and where parts shown in Figs. 1 to 8 are the same as in Figs. 9 to 15, they may be identified in Figs. 9 to 15 by the prefix "2". For example, reference character 21 designates the rudder post in Fig. 2; whereas in Fig. 9, the same element is identified by the reference character 221.

Referring now to Figs. 9 to 15 of the drawings, the rudder post 221 carries the tiller and quadrant assembly attached to it by means of a bracket 222, a clamping cap 223, all of which parts are secured in fixed relation by bolts 224, and key 225.

Top and bottom tiller plates 226 and 228 are secured to the bracket 222 by bolts 227. The end of the tiller remote from bolts 227 includes the latch plate 229, secured to the plates by screws 231. This latch plate contains ratchet teeth 232, adapted for cooperaton with a tooth 233 of detent 243.

The outer face of the latch plate likewise contains openings 234 adapted to receive a latch tooth 235, to bring about movement of the tiller and quadrant in concert for hand steering, and to permit operation with fixed rudder.

The quadrant is hinged to the tiller by hinge pin 236 which also carries an oscillating arm 237 adapted to be moved by an eccentric, as before. Carried on an extension of the oscillating arm is the detent assembly, together with the operating solenoid. Here the extension 237 has its free end mounted for sliding movement on the bottom tiller plate, thus relieving the hinge pin 236 of the weight of this member, and the lower rib 256 of the quadrant also rests on the tiller plate.

This extension carries two pivot pins 238 and 239, and pin 238 carries pivoted to it a link 241 which is also loosely connected to a pivot pin 242, upon which one end of the detent 243 is mounted. Pin 239 likewise carries a rod 244 pivoted about it and centrally pivoted to a pin 245 passing through the detent 243. The end of the rod 244 remote from pivot pin 245 is pivotally connected at 247 to the core 246 of a solenoid 248. The core 246 of this solenoid is biased to the upward or deenergized position, as shown, by a spring 250 and the solenoid is mounted within the housing 260, also carried by the extension on arms 237.

When the solenoid is energized, the detent 243 is moved downwardly to bring tooth 233 into engagement with the ratchet teeth 232, to cause the tiller to move with the oscillatting arm, the extent of movement being determined by the period of energization of the solenoid as well as upon the throw of the eccentric associated with pitman 288.

The quadrant, which is hinged about the pin 236 which carries the oscillating arm 237, comprises as before the usual cable tracks 255, separated by ribs 256 and also having bosses 257 through which the cable connecting eye-bolts may extend.

The forward arcuate section of the quadrant carries a projecting boss 258 having an opening 259 into which a pin may be inserted to anchor the quadrant to the deck of the craft. In case the steering cable should break, the automatic mechanism could in this way be used in returning the craft to port. The provision of this element always insures that the craft can be controlled by the automatic mechanism if the manual mechanism should become broken.

The latch mechanism associated with latch plate 229 is carried on the top face of the arcuate portion of the quadrant, as before, and comprises a bent arm 261 pivoted at 262 and having midway between its ends a hardened latch tooth 235, adapted for cooperation with openings 234 in latch plate 229. The end of arm 261 remote from pivot 262 carries an extension 264 containing a triangular opening into which a depending pin 265 extends from the worm gear assembly. A flat leaf spring 266 clamped to the quadrant at 267 bears against the bent arm adjacent the extension 264 and biases the latch tooth 235 to engaging position.

The actuating means provided for the apparatus is as before, a motor 269 connected to the worm gear assembly through a flexible drive shaft 271. The worm gear assembly is pivoted about a hinge pin 273 passing through a boss 272 on the quadrant. A ring-shaped housing 274 is attached to the worm gear housing 276 and carries an extension 275 in which the depending hinge pin 265 is carried for cooperation with the triangular opening in extension 264 of arm 261. The worm 277 carried on shaft 278 driven from the flexible drive 271, cooperates with a worm gear 279 which drives an eccentric disc 282 carried on a vertical shaft 281. The rotation of this eccentric causes actuation of the oscillating arm 237 through a pitman 288 pivotally connected to the arm by a pivot pin 289, secured in position by a tapered pin 291.

The circuit controlling contacts, which are actuated by the relative movement between tiller and quadrant and which perform the functions of the centering switch and the fixed rudder controller, will now be described.

The inside arcuate surface of the quadrant carries an insulating strip 301 suitably secured as by screws to the quadrant. Mounted on this insulating strip are a plurality of conducting segments, the general shape of which will be evident from an examination of Figs. 10 and 15.

The right rudder controlling segment, designated 302R, cooperates with a plurality of spring contact fingers R123, R4, and the like, secured to the latch plate 229. Contact finger R4 and those on each side of it control the angle of fixed rudder. For a greater rudder angle, R4 on the compass would be connected to the finger to the right of R4 and for a smaller rudder angle, to the finger to the left of R4. These three fingers permit an adjustment of maximum rudder angle.

In similar manner, the insulating strip 301 carries a left rudder controlling segment 302L, cooperating with spring contact fingers L123, L4, and the like. The fingers on either side of L4 permit adjustments of maximum rudder angle as described in connection with R4. It will be observed that apart from their connection with the spring contact fingers, the right and left rudder segments are connected to right and left selector brushes associated with the selector circuits, to be described later.

In addition to the contacts just described, the latch plate 229 also carries two spring fingers A and H, cooperating with an insulating segment 303 mounted on the quadrant strip 301 between the conducting segments 302R and 302L. When the tiller occupies the central position with respect to the quadrant, both of these contact fingers A and H are in engagement with insulating segment 303, and hence the circuits which these brushes control are deenergized. The function of this centering switch is the same as that in the main form of the invention previously described, namely, to furnish a means for centering the tiller with respect to the quadrant when the automatic control is to be shut off, and manual control assumed, and also to provide a means for returning the rudder to its amidships position between successive deflections. The circuit over finger H is operative throughout the entire range of rudder movement for hand steering, but the circuit controlled by finger A for automatic control operates only through the range of impulse steering. The details of the circuits will be described later.

In this modification of the invention, the use of a change-over switch is obviated, since with craft of the size for which this system is adapted sufficient accuracy of steering may be had by maintaining the same range of impulse steering in approaching the course as in leaving it. Consequently, when swings of the craft occur with the apparatus as shown, fixed rudder steering takes place only on contacts 4R and 4L, or when the craft leaves its course far enough to warrant the application of approximately 12½° to 17½° of rudder.

When the craft returns to its course far enough to disengage the latch from the opening associated with any of the #4 contact fingers on the latch plate, the centering switch becomes operative to return the rudder to amidships position between successive deflections. Hence, the only time that fixed rudder steering results is when the deviation of the craft from its course is sufficient to bring the compass contact arm into engagement with either of the compass contacts 4R or 4L.

In order to facilitate making connection to the various brushes carried by the tiller, a terminal block 304 of insulating material is carried on the top tiller plate in the vicinity of hinge pin 236. This block carries spaced connecting bolts 305, all of which are placed in circuit with the brushes on the tiller through wires carried within a common insulating sleeve 306. The provision of this terminal block, together with the connections leading to the brushes on the tiller, facilitates installation and access in case any repairs or alterations are to be carried out.

As stated above, the impulse controller, selector and timer switches have been consolidated on a single rotating disc carried by the worm gear shaft 281. The details of this switching mechanism will now be described with reference to Figs. 11, 13 and 14 of the drawings, wherein the structure is shown.

The extension of worm gear shaft 281 carries an insulating disc 307 keyed in place and spaced from the shoulder on the shaft by suitable washers 308. The disc 307 carries on its top face two conducting segments 309 and 311, spaced from each other by insulating segments 312. The segments 309 and 311 are in spaced relation to a disc 313 keyed to the extension of shaft 281 along with the disc 307, and made up of a conducting section 314 of peculiar irregular formation and insulating sections 315. The conducting segments 309 and 311 function as impulse controller contacts, whereas the conducting section 314, which is grounded at 320 (Fig. 15) serves the dual function of completing circuits for both the selector and the timer mechanism.

The disc 307, together with the conducting and insulating segments and sections carried thereon, is secured to the shaft 281 by a screw 317 upon which bears a conducting washer 316, as best shown in Fig. 11. Washer 316 grounds plate 314 to shaft 281 through screw 317, so that the whole quadrant assembly is grounded. The top of the housing 276 within which the worm gear is mounted carries a washer 318 supporting above it an insulating annulus 319 perforated to receive electrical connecting bolts for the brushes associated with the rotating circuit controller. The annulus is closed at the top by a water-tight gasket ring 321 and a cover plate 322.

The plan view, Fig. 13, shows the circuit controlling disc together with the conducting brushes supported by the insulating ring 319. As there shown, the ring carries two sets of short brushes 323 adapted for cooperation with the conducting segments 309 and 311. Each of these brushes is of spring material and has a depending button adapted to engage the conducting segments and to be held thereagainst, while the shank of the brush is held in intimate relation with the inside of annulus 319 by bolts 324 and 325, one of which also serves as a means for connecting the brush in circuit.

Although nine of these brushes are shown on each side of the disc and only four of them are shown to be in circuit, it will be understood that the purpose of providing an excess of these brushes is to make the apparatus capable of simple alteration to accommodate the steering characteristics of any craft upon which the system is to be installed. As shown, brushes 323R and 323L function as common returns for the impulse controller; whereas the other brushes shown connected, cooperate with the compass control contacts mounted in ring 155. (Fig. 15).

For convenience in tracing the circuits, the brushes 323 shown in Figs. 13 and 15, have been designated by suffixes corresponding to the numbering and lettering of the compass contacts with which they are connected.

The function of the timer for periodically energizing contact lifting magnet 156 is absorbed by a single brush 326, carried in insulating ring 319 and cooperating with the extended portions 314T of grounded conducting section 314 on insulating disc 307. It will be observed, therefore, that the circuit controlled by the brush 326 is closed twice during each revolution of the disc.

The selector for energizing the solenoid and directing rudder movements in accordance with the indication of the compass contacts and the fixed rudder controller contacts, comprises two brushes 327R and 327L, connected respectively to conducting segments 302R and 302L of the fixed rudder controller carried on the quadrant. It will be observed from an examination of Figs. 13 and 15, that both of these brushes cannot engage the conducting section 314 simultaneously but that as the disc 307 rotates in a clockwise direction, the brush 327R will be engaged slightly subsequent to disengagement of the brush 327L.

In order to clarify the operation of the modified form of the invention, the circuits of which are shown completely in Fig. 15, several typical circuits will be traced in order to emphasize the difference in operation between this mechanism and that of the main form of the invention, shown in Fig. 8.

It will first be assumed that the craft is proceeding substantially on a course which has been set by adjustment of compass ring 155, so that compass contact 1R becomes energized when the compass lifting magnet 156 has its circuit completed by the timer. It will be understood that the disc 307 is being driven constantly through the worm gear which is actuated by the motor 269, with the switch arm 328 engaging contact 329 and the switch 162 closed. The timer circuit, therefore, is:

From the positive terminal of the source through switch 162, winding 264 of the relay, switch arm 328, contact 329, wire 331, compass lifting magnet 156, wire 332, timer brush 326, conducting segment 314, to ground 320, thereby completing the circuit for the lifting magnet and bringing the contact arm into engagement with compass contact 1R.

In the circuit shown in Fig. 15, the relay is connected ahead of the compass contact lifting magnet 156. Therefore, during the operation of the centering mechanism the contact arm is not lifted. This arrangement speeds up the response of the mechanism and is of material advantage in maneuvering small mobile craft which respond quickly to rudder movements and permits the contact arm to follow the compass more closely. In the system shown in Figs. 1 to 8, the centering switch circuit includes the contact arm lifting magnet.

Rotation of the disc 307 will cause deenergization of this timer circuit as soon as brush 326 leaves the extension 314T of conducting section 314, but just previous to this disengagement of selector circuit is closed by the engagement of brush 327R with the conducting section 314.

The selector circuit thus closed is: From the positive terminal of the source over switch 162, relay 264, switch arm 328, contact 329, wire 331, lifting magnet 156, segment 157, contact arm 154, contact 1R, wire 333, impulse controller brush 323R¹, conducting segment 309, and brush 323R, wire 334, brush R123, right rudder conducting segment 302R, wire 335, selector brush 327R, conducting section 314, to ground at 320, thereby completing the selector circuit Energization of the relay by closing this circuit causes solenoid 248 to be energized over the relay contacts to ground at 336, to bring the detent 243 into engagement with the latch plate and cause the application of right rudder.

Movement of the rudder in a direction to the right causes rotation of the tiller with respect to the quadrant to bring fingers H and A into contact with conducting segment 302L. This, therefore, closes the centering switch circuit which is controlled by switch 328, to return the rudder to amidships position. The centering switch circuit which is closed is as follows:

Positive terminal of the source over switch 162, winding 264 of the relay, switch 328, wire 337, finger A, conducting segment 302L, wire 338, selector brush 327L and conducting section 314 to ground at 320, this circuit being closed by rotation of the disc 307 after contact is broken between conducting section 314 and brush 327R. In other words, a selector brush functions with the conducting segments carried by the quadrant to complete the rudder returning circuits.

It will be understood that deenergization of the circuit for solenoid 248, as selector brush 327R leaves the conducting section 314, will cause the detent 243 to be lifted from the ratchet teeth and will cause latch tooth 235 to engage the face of the latch plate 229. However, the deflection of the rudder will be insufficient to cause latch tooth 235 to engage one of the opening 234R, hence impulse steering will be carried on.

If it be assumed that the craft is near its course but that compass contact 1L is energized, a circuit will be closed in a manner similar to that just described, with the disc 307 reversed in position by 288 from the position shown in Fig. 15.

It will also be understood that movements of the craft off its course a few degrees and energization of one of compass contacts 2R or 3R or 2L or 3L, will cause the completion of circuits in a manner similar to that described. In such cases, however, different brushes 323 of the impulse controller and 327 of the selector will be included in the circuit, and also different spring contacts R or L on the latch plate. Between deflections, furthermore, the rudder will be returned to its amidships position, since the contacts 1, 2 and 3 on either side of the center of the contact ring 155 of the compass are within the impulse steering range.

In order to make clear the operation of the circuits when the craft departs from the impulse steering range so that the fixed rudder mechanism comes into operation, it will be assumed that the craft leaves its course in a starboard direction calling for the application of left rudder. It will also be assumed that this movement is sufficient to cause the contact arm 154 to engage the compass contact 4L. When the timer disc rotates to a position to complete the timer circuit over brush 326 associated with the conducting section 314, compass lifting magnet 156 will be energized, as will also the relay winding 264 and the solenoid 248.

Engagement of the contact arm 154 with contact 4L will complete the selector circuit from the positive terminal of the source over switch 162, relay winding 264, switch arm 328, contact 329, wire 331, contact segment 157, contact arm 154, compass contact 4L, wire 339, brush L4, conducting segment 302L, wire 338, brush 327L, and conducting section 314 to ground.

It will be understood that this circuit is energized just previous to the opening of the timer circuit, as the timer disc rotates. Energization of the circuits causes the detent 243 to engage the ratchet teeth and to move the tiller along with the detent as the pitman 288 swings to the left in Fig. 9. This brings the latch tooth 235 into alignment with one of the openings 234L in latch plate 229.

As soon as the circuit just traced is interrupted by disengagement between selector brush 327L and conducting section 314, the latch tooth 235 will engage an opening 234L to hold the rudder in deflected position where it will be held until subsequent energization of solenoid 248 causes it to disengage and to bring the detent 243 into engagement with the ratchet teeth again. On an extreme movement of the craft in the manner just described, the position of the quadrant will be such that centering switch finger A will ride off the conducting portion of segment 302L onto the insulating strip 301 and the centering circuit will, therefore, be inoperative until the movement of the tiller is such as to bring finger A back onto the segment 302L.

Subsequent movement of the craft toward its course will cause the compass contact arm to engage other compass contacts to exert control over the contact fingers, all of which now rest on 302L and bring the tiller within the impulse steering range, hence the centering switch circuit will become operative in the manner previously set forth in tracing the circuit associated with contact 1R of the compass. The centering switch circuit will, of course, be closed through the selector switch 327R, since a right movement of the rudder will be necessary in returning it to amidships position after a left deflection.

From the foregoing, the operation of the remaining circuits associated with the compass contacts will be understood without further explanation.

Fig. 15 shows diagrammatically a remote control switch similar to that employed in connection with the main form of the invention. The switch arm 328 normally engages contact 329 for automatic steering. When, however, it is desired to switch in the remote hand control apparatus, this switch arm is moved into engagement with a contact 341. A switch arm 342 associated with contact 341 may occupy any one of three positions to engage a center contact 343, a right rudder contact 344R or a left rudder contact 344L. Contact 343 is connected by a wire 340 with the centering switch finger H located on the tiller in vertical alignment with the segment engaging portion of finger A and with the insulating section 303 between conducting segments 302L and 302R.

It has been found that when the automatic steering mechanism is deenergized, it sometimes happens that the tiller does not center exactly with the quadrant. Hence, when hand steering is resorted to, perhaps once in twenty times the tiller may not occupy the amidships position. This would occur if the change from automatic to hand steering were effected when the craft was considerably off its course and fixed rudder was being applied. In order to overcome this difficulty and to make it possible for the apparatus to be centered automatically, when the automatic mechanism is deenergized, the finger H is provided. Accordingly, when switch 328 is moved out of engagement with contact 329, thereby deenergizing the automatic control circuit, and into engagement with contact 341, and the switch arm 342 of the remote hand control circuit engages contact 343, a circuit is established from the positive terminal of the source over switch 162, winding 264 of the relay, switch arm 328, contact 341, switch arm 342, contact 343, wire 340, finger H, one or the other of the conducting segments 302L or 302R, and from one of these segments to the corresponding brush 327L or 327R, and conducting section 314 to ground at 320. Accordingly, since the motor 269 is rotating the eccentric will swing the tiller until the circuit is broken by engagement of finger H with the insulating segment 303 between the conducting segments 302L and 302R on the quadrant.

It will be seen that this provides a simple automatic and positive means of returning the tiller to its amidships position when the automatic mechanism is to be shut off, it being understood, of course, that energization of the relay energizes solenoid 248 to actuate the tiller from the crank.

Inasmuch as it is ordinarily only desired to exercise remote control of the craft in emergencies, as to avoid marine obstructions which are sighted when the craft is in close proximity to them, it will be sufficient to provide the remote control switch with only two contacts, namely, one associated with the extreme right conducting segment of the compass contact 4R, and another one with the corresponding left compass contact 4L.

Accordingly, the switch contact 344R is connected by the wire 345 leading from compass contact 4R to finger R4 on the tiller, and the operating circuit is controlled in the same manner that it would be if the circuit had been controlled through movement of the compass arm 154 rather than the hand switch 342. In similar manner, left contact 344L of the remote control switch is connected to compass contact 4L over wires 346 and 339 and, likewise, to finger L4 on the tiller.

It will be understood that the simple modification of the invention just described is capable of accomplishing accurate steering but lacks some of the refinements of the main form of the invention. The structure is materially simplified and may be employed for installation on small craft where complication and expense are to be avoided, and where results desired do not justify the use of all of the refinements present in the system of Fig. 8.

In the application of the invention just described, it has been assumed that the worm gear is driven through a flexible drive connected to a motor mounted apart from the quadrant.

On some large installations, it may be preferable to mount the motor directly on the quadrant so that the motor swings with the quadrant during hand steering, thereby avoiding the use of a flexible driving connection and avoiding the power loss incidental to the use of a flexible shaft. In Fig. 16, one form which the apparatus may assume is illustrated. As shown in that figure, the reference character 347 designates the side of the quadrant on which the worm gear assembly 348 is mounted. The motor 353 is mounted on a base 352 comprising arms 349 and 351, which are secured to hinge pin 373. The motor and worm gear assembly are thus rigidly connected together and hinged to the quadrant by pin 373. In this way the worm gear assembly and the motor which is fixedly connected with it are permitted to pivot sufficiently to release the latch on the quadrant. It will be understood, therefore, that in either of the modifications of the invention described or in any other embodiment thereof, the driving motor may be mounted directly on the quadrant, if desired.

So far in this description it has been assumed that the steering mechanism is directly connected to the rudder of the craft upon which it is installed. It will be obvious, however, that the installation may take the form of a remote control, such as would be used on a large craft equipped with a power steering engine. Although the details of the installation will vary considerably depending upon the particular design of the steering mechanism of the craft, one form of such an installation will be described briefly in connection with the diagrammatic view shown in Fig. 17.

Referring now to Figure 17, the reference character 355 designates the pilot wheel of a vessel as it would be installed on the bridge of large ocean-going craft. This wheel is designed to operate a telemotor of usual construction and here shown by way of example as embodying a hydraulic cylinder 356 containing a movable piston 357 adapted to be actuated through a rack 358 connected directly to the piston and driven from a gear 359 on the shaft of the pilot wheel.

Connected to the ends of the cylinder 356 and on opposite sides of the piston within this cylinder, are pipes 361 and 362, connected respectively to hydraulic cylinders 363 and 364. Each of these cylinders contains a portion of a plunger 365 maintained in liquid-tight relation with respect to the cylinders through suitable stuffing boxes 366. Attached to the plunger midway between the two cylinders is an arm 367, one end of which carries a boss 368 surrounding a rod 369 attached to the two cylinders by means of brackets 371. Reacting between the boss 368 on either side are centering springs 372 adapted to assist centralizing of the plunger 365 within the cylinders 363 and 364.

Pivotally attached to the arm of 367 remote from the boss 368, is an adjustable tie rod 370 pivotally connected to a quadrant 374 at 375. As here shown, this quadrant is of substantially the same appearance as it assumes in the forms of the invention described in connection with direct rudder control. It may, however, embody a different form if desired, but in any case will have substantially the same operating parts as those shown herein.

The quadrant may conveniently be hinged to a bracket 376 rigidly attached to a portion of the vessel, and the pivot 377 also supports the movable tiller 378 carrying circuit controlling mechanism 379, similar to that shown in Figs. 1 to 8 of the drawings. The quadrant 374 will also carry the worm gear assembly 381 driven from a motor 382, here shown as attached to the quadrant, although it will be obvious that the motor may be connected through a flexible drive as already described. Inasmuch as the other parts of this quadrant construction coincide in detail substantially with those already described, it will merely be necessary to state that the tiller 378 is connected by a link 383 and a pivoted arm 384 with the control means of the steering engine.

For purposes of adjustment and in order to accommodate the mechanism to installation on varying types of craft, the tiller 378 is provided with a plurality of pivot points 386, to which the right hand end of link 383 may be connected.

For purposes of illustration, a steering engine is shown as controlled by a valve rod 385 connected to arm 384. The control valve may be supplied with pressure fluid from a suitable source connected to pipe 402. The engine is here shown as comprising two steam cylinders 387L and 387R. These cylinders are connected by pipes 388 and 389 to the valve controlled by rod 385.

The steam cylinders serve to operate the steam steering engine which is shown diagrammatically. Since the steering engine does not form a novel part of the present invention, it will suffice to say that in the example shown the moving parts of cylinders 387L and 387R are connected by a worm 391 and gearing 392 to teeth 395 on quadrant 396. The quadrant 396 and tiller 398 are centered by springs 399 acting between fixed abutments 401 and tiller 398.

It will accordingly be understood that with the valve rod 385 in the position shown, the rudder is centered. Movement of the rod in either direction causes movement of the rudder 397 in one direction or the other. Consequently, movement of the tiller 378 will cause movement of the rudder, and when the tiller is in its central position as shown, the rudder will also be centered.

Under ordinary conditions, when the automatic control is in operation, the motor 382 will rotate the eccentric mechanism connected to it and oscillate the arm, which will at times move the tiller 378, thus making adjustments of rod 385 to control actuation of the rudder of the vessel.

This control may be exercised by the compass of the vessel, be it magnetic or gyroscopic, and the operating parts may function in the manner described in connection with Figs. 1 to 8 of the drawings. If, at any time, it is desired to exercise manual control of the craft, the pilot wheel 355 may be actuated to cause movement of the plunger within cylinders 363 and 364 and, hence, to move through the arm 367 and tie rod 370, the quadrant 374 carrying with it the tiller 378, and making adjustments of the control rod 385 through direct mechanical and hydraulic connections.

This control may be exercised under emergency conditions without disconnecting the automatic control, as it will be evident that the tiller and quadrant will be connected together by the latch mechanism during periods of deenergization of the solenoid carried on the oscillating arm within the tiller. When the automatic mechanism is entirely shut off, and the tiller is centered with respect to the quadrant 374, direct series relation for manual control is had, since the tiller 378 and the quadrant 374 will function as one part connecting tie rod 370 with link 383 and arm 384 to actuate the control rod 385 of the steering engine. It will be understood that the mechanism here shown diagrammatically is merely by way of example and that changes may be necessary in the details to accommodate the component parts to the peculiarities of a typical steering system with which the automatic control is to be associated.

My prior application, Serial No. 550,792, filed July 14th, 1931, discloses and claims relay apparatus for causing the character of the rudder movements to be different when the craft is approaching its course than when it is departing from its course, so as to prevent overrunning the course. The function of the relay apparatus in that case has been absorbed by the change-over switch in the present apparatus, and this results in not only simplifying the circuits and reducing the number of contacts, but the tendency of the craft to overrun its course is reduced still further.

From the foregoing specification, it will be observed that the apparatus disclosed is capable of installation on craft of varying sizes and characteristics and that the details of operation may be altered by adjusting or varying the cooperative relation of the various components as conditions may dictate. The periods and ranges of impulse and fixed rudder steering may be changed and correlated to give best results in typical installations with which the system is identified.

Accordingly, it is desired that the embodiments of the invention described and claimed shall not be limited in their application, other than as such limitation be required by the disclosures of the prior art.

What is claimed is:

1. The method of steering dirigible craft, which consists in imparting to the rudder at fixed time intervals when the craft is slightly off its course, periodic corrective deflections with intervening periods in which the rudder is allowed to trail freely, and when the craft is substantially further off its course, holding the rudder continuously deflected.

2. The method of steering dirigible craft, which consists in imparting to the rudder at predetermined time intervals when the craft is slightly off its course, periodic corrective deflections with intervening periods in which the rudder is allowed to trail freely, and when the craft is substantially further off its course, holding the rudder continuously deflected, and then resuming the periodic deflections when the craft approaches its course again.

3. The method of steering dirigible craft, which consists in imparting to the rudder at fixed time intervals when the craft is slightly off its course, periodic corrective deflections with intervening periods in which the rudder is returned to mid position, and when the craft is substantially further off its course, holding the rudder continuously deflected.

4. The method of steering dirigible craft, which consists in imparting to the rudder at predetermined time intervals when the craft is slightly off its course, periodic corrective deflections with intervening periods in which the rudder is returned to mid position, and when the craft is substantially further off its course, holding the rudder continuously deflected, and then resuming the periodic deflections when the craft approaches its course again.

5. The method of steering dirigible craft, which consists in imparting to the rudder at fixed time intervals when the craft is off but near its course, periodic corrective deflections of small amplitude, with intervening periods in which the rudder is allowed to trail, returning the rudder to mid position between deflections, holding the rudder continuously deflected through larger amplitudes during periods of greater deviation of the craft from its course, and then resuming the periodic deflections when the craft returns to a position near its course.

6. The method of steering dirigible craft, which consists in subjecting the rudder at predetermined time intervals to periodic impulses and returning it to mid position between impulses when the craft is near its course and the effect of each rudder impulse dies out before the succeeding impulse is started, and holding the rudder continuously deflected when the position of the craft relative to its course is such as to cause rudder impulses of larger amplitude so that their effects would overlap.

7. The method of steering dirigible craft, which consists in periodically and at predetermined time intervals swinging the rudder away from and returning it to its mid position, varying the effects of the swings in accordance with the angular position of the craft relative to its course, and holding the rudder continuously in deflected position when the angular position of the craft is such that the effects of individual rudder swings would overlap.

8. The method of steering dirigible craft, which consists in periodically and at predetermined time intervals swinging the rudder away from and returning it to its mid position when the craft is near its course, increasing the amplitude of the swings as the craft swings further away from its course, holding the rudder continuously deflected when the effects of the swings would overlap, and again swinging the rudder periodically from and returning it to its mid position as the craft returns to its course.

9. The method of steering dirigible craft, which consists in subjecting the rudder at fixed time intervals to periodic impulses and returning it to its mid position when the craft is off but near its course, increasing the effects of the impulses as the angular deviation of the craft from its course increases, holding the rudder continuously deflected when the position of the craft causes impulses of larger amplitude so that their effects would overlap, increasing the range of continuous rudder and decreasing the range of impulse rudder as the craft swings away from its course, and increasing the range of impulse rudder and decreasing the range of continuous rudder as the craft swings toward its course.

10. The method of steering dirigible craft, which consists in subjecting the rudder at predetermined time intervals to periodic corrective swings and returning it to its mid position between swings when the craft is off but near its course, holding the rudder continuously deflected when the craft is substantially further off its course, and resuming the periodic swings as the craft returns to its course while the craft is at a greater angular deviation from its course than the deviation at which the swings were changed to continuously deflected rudder.

11. An automatic steering system for dirigible craft, comprising means for applying periodic corrective swings to the rudder and for returning it to the mid position between swings when the craft has deviated slightly from its course; means for holding the rudder continuously deflected when the craft has deviated further from its course; and means for resuming the periodic swings as the craft returns to its course.

12. An automatic steering system for dirigible craft, comprising means for applying periodic corrective swings to the rudder and for returning it to the mid position between swings when the craft has deviated slightly from its course; means for holding the rudder continuously deflected when the craft has deviated further from its course; and means for resuming the periodic swings as the craft returns to its course, said periodic swings being resumed while the craft is at a greater deviation from its course than it was when they were changed to continuously deflected rudder.

13. The combination with a tiller, of a quadrant pivotally connected thereto; means for moving said tiller with respect to said quadrant; means for rendering said first means operative; and automatic means for causing said tiller and quadrant to move in concert when said second named means is deenergized.

14. The combination with a tiller, of a quadrant pivotally connected thereto; means for moving said tiller with respect to said quadrant; electromagnetic means for rendering said first means operative; and automatic means for causing said tiller and quadrant to move in concert when said electromagnetic means is deenergized.

15. The combination with a tiller, of a quadrant pivotally connected thereto; means carried by the quadrant for swinging said tiller; and automatic means for securing the quadrant positively to the tiller when the tiller is inactive.

16. In an automatic steering system for dirigible craft, a tiller; a quadrant pivoted to said tiller; means including an oscillating pawl for actuating said tiller; and direction indicating means for causing said pawl to be connected to the tiller to actuate the same in accordance with craft movements.

17. In an automatic steering system for dirigible craft, a tiller having ratchet teeth thereon; a quadrant pivotally connected to said tiller; means including an oscillating pawl carried by said tiller; and electrically controlled means for causing engagement of said pawl with said ratchet teeth.

18. In an automatic steering system for dirigible craft, a tiller; a quadrant hinged to said tiller; constantly rotating means on said quadrant; ratchet and pawl mechanism for operatively connecting said rotating means to the tiller to actuate the tiller; latching means for connecting the quadrant and tiller together for movement in concert when the ratchet and pawl are disengaged; and means for disconnecting said latch when the pawl and ratchet are engaged.

19. In an automatic steering system for dirigible craft, a tiller; a quadrant pivotally connected to the tiller; power means on said quadrant; means for connecting said power means to the tiller; and means for connecting the tiller and quadrant for concertive movement when the power means is disconnected from the tiller.

20. In an automatic steering system for dirigible craft, a quadrant and tiller pivoted together for relative movement; power means for actuating the tiller; a latch for connecting the tiller to the quadrant; means for disconnecting said latch whenever the power means is actuating the tiller; and means for automatically connecting said latch when the power means ceases to actuate the tiller.

21. An automatic steering system for dirigible craft, comprising a quadrant and tiller pivotally connected together for relative movement; means on the quadrant for deflecting the tiller relatively to the quadrant; automatic switching means for controlling tiller movements in accordance with movements of the craft relative to its course; and switching means for causing the tiller to be returned to its mid position between successive deflections.

22. An automatic steering system for dirigible craft, comprising a quadrant and tiller pivotally connected for relative movement; means on the quadrant for actuating the tiller; means for connecting said actuating means to said tiller at intervals when the craft is off its course; automatic switching means for causing the tiller to return to its mid position between successive deflective movements; and means for rendering said tiller-returning means ineffective when the tiller deflections exceed a predetermined amount.

23. The method of steering dirigible craft, which consists in subjecting the rudder at fixed time intervals to periodic corrective swings and returning it to its mid position between swings when the craft is off but near its course, holding the rudder continuously deflected when the craft is substantially further off its course, and resuming the periodic swings as the craft returns to its course, the transition from fixed rudder to impulse rudder occurring at a greater angle of deviation of the craft on its return to its course than that at which the transition from impulse rudder to fixed rudder occurred as the craft departed from its course.

24. The combination with a ship steering system including a steering engine and manual control means remotely related thereto, of automatic steering means including a continuously operating power device connected in series relation with and between the steering engine and manual control means.

25. The combination with a ship steering system including a steering engine and manual control means therefor including a liquid telemotor, of automatic steering means including a continuously operating power device connected between said engine and said telemotor, said automatic means being constructed and arranged to permit manual control of the steering engine at all times whether the automatic means be active or inactive.

26. The combination with a ship steering system including a steering engine, of manually controlled means for operating said engine; and automatic compass controlled steering means including a continuously rotating power source interposed between said manually controlled means and said engine and permitting manual operation of said engine whether the automatic means be active or inactive.

27. The combination with a ship steering system including a steering engine, of manually controlled means for directing the movements of said engine; and automatic means interposed between said manual means and said engine, said automatic means including a continuously operating power means and compass controlled means for connecting and disconnecting the power means and steering engine to control ship movements in accordance with compass indications.

28. The combination with a ship steering system including a steering engine, of a quadrant; manually controlled means operatively connected to said quadrant; a tiller pivoted on said quadrant and operatively connected with said engine; power means for actuating said tiller; and compass controlled means for controlling the connection of said tiller to the power means to direct the ship's movement in accordance with compass indications.

29. Automatic steering mechanism for dirigible craft, comprising means for subjecting the rudder to periodic deflections over an impulse range of craft movement near a set course; means for holding the rudder continuously deflected over a fixed rudder range of craft movement substantially away from the set course; and means controlled by movement of the craft relative to the set course for changing from one range of craft movement to the other at predetermined angular positions of the craft relative to the course.

30. Automatic steering mechanism for dirigible craft, comprising means for subjecting the rudder to periodic deflections over an impulse range of craft movement near a set course; means for holding the rudder continuously deflected over a fixed rudder range when the craft deviates by a predetermined amount from the set course; and means controlled by craft movement toward the course for resuming the periodic deflections of the rudder at a predetermined point of greater angular deviation of the craft from the course than that at which the fixed rudder range began when the craft departed from its course.

31. Automatic steering mechanism for dirigible craft, comprising means for periodically deflecting the rudder and returning it to zero position over an impulse range of craft movement near a set course; means for holding the rudder continuously deflected when the craft deviates from its set course through a predetermined angle; and means operative at an angle of craft deviation greater than that at which continuous deflection began for resuming the periodic rudder deflections when the craft approaches its course.

32. In an automatic steering system for dirigible craft, a quadrant and tiller hinged for relative movement; tiller actuating means including oscillating means adapted to cause actuation of the tiller; compass controlled means for controlling the engagement and disengagement of said oscillating means and said tiller; and latching means for locking said tiller and quadrant together when the oscillating means and tiller are disengaged by the compass controlled means.

33. In an automatic steering system for dirigible craft, a quadrant and tiller pivotally connected for relative movement; tiller actuating means; means for connecting said actuating means to the tiller; and means for locking the quadrant and tiller together when the actuating means is disconnected from the tiller.

34. In an automatic steering system for dirigible craft, a quadrant and tiller pivotally connected for relative movement; tiller actuating means; means for connecting said actuating means to the tiller; means for latching the quadrant and tiller together when the actuating means is disconnected from the tiller, said means being effective to latch said parts only when the tiller is in amidships position or is deflected through a substantial angle on either side of the amidships position.

35. In an automatic steering system for dirigible craft, a quadrant; a tiller pivotally connected to said quadrant, said tiller including an arcuate member having ratchet teeth on its inner face, and latch openings in its outer face, the latch openings being located one substantially centrally of the ends of the member and the other openings substantially spaced from said central opening; tiller actuating means; compass controlled means including a pawl for connecting and disconnecting the tiller actuating means and the ratchet teeth; a latch carried by the quadrant for cooperation with the latch openings in the arcuate member; and means for disengaging the latch from the arcuate member when the pawl engages a ratchet tooth.

36. In an automatic steering system for dirigible craft, a quadrant and tiller pivotally connected for relative movement; tiller actuating means carried by the quadrant; a compass having a contact ring and a movable contactor; a first electromagnetic means for moving said contactor into engagement with said contact ring; a second electromagnetic means for causing connection of the tiller actuating means to the tiller when the contactor is lifted by the first electromagnetic means, the two electromagnetic means being in series when the circuit is completed, and the second means serving as a resistance to limit current flow through the first means.

37. In an automatic steering system for dirigible craft comprising rudder actuating means; compass controlled contact means including a relay controlling the rudder actuating means, said compass controlled means including an electromagnet; a remote control switching means for controlling the rudder actuating means manually; a source of current; means for connecting either the compass controlled means or the remote control means to said source; and a resistance in series with the remote control means to limit the current flowing through the relay when the remote control means is in circuit.

38. In an automatic steering system for dirigible craft, a quadrant and tiller pivoted together for relative movement; ratchet teeth on said tiller; a swinging pawl carried by the quadrant; a worm and gear mounted on said quadrant and connected to said pawl to actuate the same; a solenoid mounted on said arm for moving said pawl into engagement with the ratchet teeth on the tiller; and compass controlled means for controlling the energization of the solenoid.

39. In an automatic steering system for dirigible craft, a quadrant and tiller pivoted together for relative movement; compass controlled means for actuating the tiller to deflect the rudder; and electric switching means for causing the rudder to return to zero position between successive deflections within a predetermined range.

40. In an automatic steering system for dirigible craft, a quadrant and tiller pivoted together for relative movement; compass controlled means for actuating the tiller to deflect the rudder; and electric switching means actuated by relative movement between the tiller and quadrant for causing the rudder to return to zero position between successive deflections within a predetermined range.

41. In an automatic steering system for dirigible craft, a quadrant and tiller hinged together for relative movement; a rudder connected to the tiller; means on the quadrant for actuating the tiller; compass controlled means for controlling the movements of the tiller; and electric control means for periodically deflecting the rudder and returning it to zero through an impulse rudder range, or holding it continuously deflected through a fixed rudder range depending upon the angular deviation of the craft from the course.

42. In an automatic steering system for dirigible craft, a quadrant and tiller hinged together for relative movement; a rudder connected to the tiller; means on the quadrant for actuating the tiller; compass controlled means for controlling the movements of the tiller; electric control means for periodically deflecting the rudder and returning it to zero through an impulse rudder range, or holding it continuously deflected through a fixed rudder range depending upon the angular deviation of the craft from the course; and a switch for changing from one range to the other at predetermined angles of craft deviation as the craft departs from or returns toward its course.

43. In an automatic steering system for dirigible craft, rudder actuating means; compass controlled means for controlling movements of the rudder; and means controlled by the position of the craft for causing periodic deflection of the rudder and return of the rudder to zero between deflections through an impulse range or causing it to be held continuously deflected through a fixed rudder range.

44. In an automatic steering system for dirigible craft, rudder actuating means; compass controlled means for controlling movements of the rudder; means controlled by the position of the craft for causing periodic deflection of the rudder and return of the rudder to zero between deflections through an impulse range or causing it to be held continuously deflected through a fixed rudder range; and means for changing from one range to the other at predetermined angles of craft deviation as the craft departs from or returns toward its course.

45. In an automatic steering system for dirigible craft, rudder actuating means; compass controlled means for controlling the operation of the rudder actuating means; and controlling means for causing the rudder to be periodically deflected and returned to zero between deflections through an impulse range or to be continuously deflected without returning to zero through a fixed rudder range.

46. In an automatic steering system for dirigible craft, rudder actuating means; compass controlled means for controlling the operation of the rudder actuating means; controlling means for causing the rudder to be periodically deflected and returned to zero between deflections through an impulse range or to be continuously deflected without returning to zero through a fixed rudder range; and a switch for changing the rudder control from the impulse range to the fixed range at one angle of craft deflection and from the fixed range to the impulse range at another angle of deflection.

47. In an automatic steering system for dirigible craft, rudder actuating means; compass controlled means for controlling the operation of the rudder actuating means; controlling means for causing the rudder to be periodically deflected and returned to zero between deflections through an impulse range or to be continuously deflected without returning to zero through a fixed rudder range; and a switch for changing the rudder control from the impulse range to the fixed range at one angle of craft deflection and from the fixed range to the impulse range at another angle of deflection, the change in rudder control from the fixed range to the impulse range occurring at a greater angle of craft deflection than the change from the impulse range to the fixed range.

48. In an automatic steering system for dirigible craft, an electric steering engine; automatic mechanism located at a fixed station on the craft for controlling the operation of said engine in response to changes in heading of the craft; and an electric controlling device comprising a flexible cable separably connected to said fixed station and having at its free end a portable electric switch mechanism, said mechanism including means for at will transferring control from said station to said device or from said device to said station, said mechanism also including manually operable means for controlling said engine when control is transferred from said station to said device.

49. In an automatic steering system for dirigible craft having a rudder, a rudder actuating means; compass directed means for controlling said rudder actuating means; a portable electrical control device; means in said device for transferring control of said rudder actuating means from said compass to said device, or from said device to the compass; other means in said device for causing left or right rudder application selectively when control is transferred to said device; and means for causing the rudder to assume its mid position when said device is in circuit and both of said left and right rudder applying means are ineffective.

50. In an automatic steering system for dirigible craft having a rudder, a rudder actuating means; compass directed means for controlling said rudder actuating means; a portable electrical control device; means in said device for transferring control of said rudder actuating means from said compass to said device, or from said device to the compass; and other means in said device for causing left, right and centering rudder movements selectively when control is transferred to said device.

BRADFORD B. HOLMES.